United States Patent
Eager et al.

(10) Patent No.: US 9,646,308 B1
(45) Date of Patent: May 9, 2017

(54) TOOL FOR SELLING AND PURCHASING VEHICLE HISTORY REPORTS

(75) Inventors: William W. Eager, Ashburn, VA (US); Scott R. Fredericks, Arlington, VA (US); Pia Constancia S. Miralao, Vienna, VA (US); Mark D. Andringa, Vienna, VA (US); Steven R. Korman, Bethesda, MD (US); Matthew D. Mountz, Reston, VA (US)

(73) Assignee: Carfax, Inc., Centreville, VA (US)

( * ) Notice: Subject to any disclaimer, the term of this patent is extended or adjusted under 35 U.S.C. 154(b) by 1819 days.

(21) Appl. No.: 12/579,369

(22) Filed: Oct. 14, 2009

Related U.S. Application Data

(63) Continuation of application No. 12/177,054, filed on Jul. 21, 2008, now abandoned.

(60) Provisional application No. 61/059,729, filed on Jun. 6, 2008.

(51) Int. Cl.
*G06Q 30/00* (2012.01)

(52) U.S. Cl.
CPC .................... *G06Q 30/00* (2013.01)

(58) Field of Classification Search
CPC .......................................... G06Q 30/06–30/08
USPC .................................................. 705/26–27.2
See application file for complete search history.

(56) References Cited

U.S. PATENT DOCUMENTS

| | | | |
|---|---|---|---|
| 4,404,639 A | 9/1983 | McGuire et al. | |
| 4,989,144 A | 1/1991 | Barnett et al. | |
| 5,001,714 A | 3/1991 | Stark et al. | |
| 5,127,005 A | 6/1992 | Oda et al. | |
| 5,361,201 A | 11/1994 | Jost et al. | |
| 5,493,729 A | 2/1996 | Nigawara et al. | |
| 5,521,815 A | 5/1996 | Rose, Jr. | |
| 5,598,511 A | 1/1997 | Petrinjak et al. | |
| 5,774,883 A | 6/1998 | Andersen et al. | |
| 5,794,164 A | 8/1998 | Beckert et al. | |
| 5,826,258 A | 10/1998 | Gupta et al. | |
| 5,842,205 A | 11/1998 | Brann | |
| 5,844,987 A | 12/1998 | Matthews et al. | |
| 5,899,978 A | 5/1999 | Irwin | |
| 5,899,985 A | 5/1999 | Tanaka | |
| 5,917,405 A | 6/1999 | Joao | |
| 5,931,878 A | 8/1999 | Chapin, Jr. | |
| 5,963,949 A | 10/1999 | Gupta et al. | |

(Continued)

FOREIGN PATENT DOCUMENTS

JP 2003-30235 1/2003

OTHER PUBLICATIONS

"Research Proposal for Carfax," dated Sep. 8, 2003.
(Continued)

*Primary Examiner* — Ethan D Civan
(74) *Attorney, Agent, or Firm* — Fish & Richardson P.C.

(57) ABSTRACT

Systems and methods for selling and purchasing vehicle history reports are described. In one embodiment, a method includes determining a set of vehicles in a dealer inventory, determining a subset of the vehicles in the dealer inventory for which the dealer has not purchased a vehicle history report, presenting a summary report to a dealer, the summary report including information about at least one of the vehicles in the subset of the vehicles, receiving a selection to purchase a vehicle history report for at least one of the vehicles in the summary report, and providing the vehicle history report corresponding to the selection to the dealer.

20 Claims, 16 Drawing Sheets

(56) References Cited

U.S. PATENT DOCUMENTS

| | | | |
|---|---|---|---|
| 5,999,878 | A | 12/1999 | Hanson et al. |
| 6,006,201 | A | 12/1999 | Berent et al. |
| 6,026,345 | A | 2/2000 | Shah et al. |
| 6,052,631 | A | 4/2000 | Busch et al. |
| 6,076,064 | A | 6/2000 | Rose, Jr. |
| 6,092,193 | A | 7/2000 | Loomis et al. |
| 6,098,061 | A | 8/2000 | Gotoh et al. |
| 6,240,365 | B1 | 5/2001 | Bunn |
| 6,259,354 | B1 | 7/2001 | Underwood et al. |
| 6,263,322 | B1 | 7/2001 | Kirkevold et al. |
| 6,304,870 | B1 | 10/2001 | Kushmerick et al. |
| 6,339,745 | B1 | 1/2002 | Novik |
| 6,370,454 | B1 | 4/2002 | Moore |
| 6,397,131 | B1 | 5/2002 | Busch et al. |
| 6,476,715 | B1 | 11/2002 | Bromer |
| 6,505,106 | B1 | 1/2003 | Lawrence et al. |
| 6,609,108 | B1 | 8/2003 | Pulliam et al. |
| 6,643,641 | B1 | 11/2003 | Snyder |
| 6,714,933 | B2 | 3/2004 | Musgrove et al. |
| 6,728,685 | B1 | 4/2004 | Ahluwalia |
| 6,754,564 | B2 | 6/2004 | Newport |
| 6,785,671 | B1 | 8/2004 | Bailey et al. |
| 6,834,048 | B1 | 12/2004 | Cho et al. |
| 7,113,853 | B2 | 9/2006 | Hecklinger |
| 2001/0011221 | A1 | 8/2001 | Underwood |
| 2001/0053995 | A1 | 12/2001 | Nishimoto |
| 2001/0054017 | A1 | 12/2001 | Wakabayashi et al. |
| 2002/0016655 | A1 | 2/2002 | Joao |
| 2002/0024537 | A1 | 2/2002 | Jones et al. |
| 2002/0032626 | A1 | 3/2002 | DeWolf et al. |
| 2002/0042752 | A1 | 4/2002 | Chaves |
| 2002/0065707 | A1 | 5/2002 | Lancaster et al. |
| 2002/0065844 | A1 | 5/2002 | Robinson et al. |
| 2002/0072808 | A1 | 6/2002 | Li |
| 2002/0082930 | A1 | 6/2002 | Park |
| 2002/0082934 | A1 | 6/2002 | Koda et al. |
| 2002/0087420 | A1 | 7/2002 | Higgins et al. |
| 2002/0087423 | A1 | 7/2002 | Palango et al. |
| 2002/0091706 | A1 | 7/2002 | Anderson et al. |
| 2002/0099618 | A1 | 7/2002 | Stiberman |
| 2002/0107882 | A1 | 8/2002 | Gorelick et al. |
| 2002/0123840 | A1 | 9/2002 | Obata et al. |
| 2002/0143646 | A1 | 10/2002 | Boyden et al. |
| 2002/0169640 | A1 | 11/2002 | Freeland |
| 2002/0194051 | A1* | 12/2002 | Hall et al. ............... 705/10 |
| 2003/0036964 | A1 | 2/2003 | Boyden et al. |
| 2003/0167209 | A1 | 9/2003 | Hsieh |
| 2004/0199430 | A1 | 10/2004 | Hsieh |
| 2004/0243588 | A1 | 12/2004 | Tanner et al. |
| 2004/0267818 | A1 | 12/2004 | Hartenstine |
| 2005/0050031 | A1 | 3/2005 | Matsumoto |
| 2005/0114270 | A1 | 5/2005 | Hine et al. |
| 2005/0154664 | A1* | 7/2005 | Guy et al. ............... 705/35 |
| 2005/0177337 | A1 | 8/2005 | Beyer et al. |
| 2006/0015377 | A1 | 1/2006 | Hoogs et al. |
| 2006/0149674 | A1 | 7/2006 | Cook et al. |
| 2008/0231446 | A1* | 9/2008 | Cresto ............... 340/572.1 |

OTHER PUBLICATIONS

"Saturn Retail Project," date printed May 2001-Sep. 2001.
"Carfax Rental Car Valuation Exercise," for 2000 Honda Accord.
www.kbb.com, "Kelley Blue Book," Advice, New Car Values/Used Car Values, date printed Jul. 12, 2004.
www.kbb.com, "Kelley Blue Book," Condition Quiz—Appraise Your Own Vehicle, 2002 BMW 7 Series 745Li Sedan 4D, date printed Jun. 10, 2003.
www.kbb.com, "Kelley Blue Book," Blue Book Trade-In Report, 2002 BMW 7 Series 745Li Sedan 4D, date printed Jun. 10, 2003.
www.kbb.com, "Kelley Blue Book," Trade-In, 2002 BMW 7 Series 745Li Sedan 4D, date printed Jun. 10, 2003.
www.edmunds.com, "Used Cars, 2001 BMW 7 Series, Used Car Appraiser, Step 1-Step 6," date printed Jun. 10, 2003.
www.edmunds.com, "Certified Pre-Owned Cars," date printed Jul. 12, 2004.
auto.consumerguide.com, "The Truth About Cars," date printed Jun. 10, 2003.
"Powered by Intelliprice," 2001 BMW 7 Series 4D Sedan 740iL, specify vehicle to trade, pp. 1 of 1, date printed Jun. 10, 2003.
"Powered by Intelliprice," 2001 BMW 7 Series 4D Sedan 740iL, Verify Equipment, p. 1 of 1, date printed Jun. 10, 2003.
"Powered by Intelliprice," 2001 BMW 7 Series 4D Sedan 740iL, Describe the condition of your vehicle, p. 1 of 1, date printed Jun. 10, 2003.
http://nada.org, "National Automobile Dealers Association Online," Home Page, pp. 1 of 2, date printed Jul. 15, 2004.
www2.nadaguides.com, "Build and Price a New Car," Request a new car quote, p. 1 of 1, date printed Jul. 12, 2004.
www2.nadaguides.com, "Build and Price a New Car," Select Body Style or Category, pp. 1 of 2, date printed Jul. 12, 2004.
www2.nadaguides.com, "Build and Price a New Car," Select Mileage & Options, pp. 1 of 2, date printed Jul. 12, 2004.
www2.nadaguides.com, "Build and Price a New Car," Vehicle Report, pp. 1 of 2, date printed Jul. 12, 2004.
www.intellichoice.com, "Used Car Truck SUV Research by Make Model Price," pp. 1 of 2, date printed Jul. 14, 2004.
www.intellichoice.com, "2000 Mercury Mystique—At a Glance," Vehicle Report, pp. 1 of 2, date printed Jul. 14, 2004.
www.intellichoice.com, "2000 Mercury Mystique—Used Valuation," Vehicle Report, pp. 1 of 3, date printed Jul. 14, 2004.
www.intellichoice.com, "2000 Mercury Mystique—Used Valuation Adjusted," Vehicle Report, pp. 1 of 2, date printed Jul. 14, 2004.
www.autocheck.com, "AutoCheck Vehicle History Reports: Free VIN Check," p. 1 of 1, date printed Jul. 14, 2004.
www.autocheck.com, "Welcome to AutoCheck," pp. 1 of 4, date printed Jul. 12, 2004.
www.autocheck.com, "Sample Reports," An AutoCheck Clean Bill of Health: 2G1WL54T4L9101564, 1990 Chevy Lumina, pp. 1 of 3, date printed Jul. 12, 2004.
www.kbb.com, "Kelley Blue Book," Blue Book Trade-in Report, 2002 BMW 7 Series 745 Li Sedan 4D, p. 1 of 2, date printed Jun. 10, 2003.
www.autotrader.com, "Used Cars, Sell Your Car, Auto Financing & Insurance," p. 1 of 1, date printed Jul. 12, 2004.
www.autotrader.com, "Used Cars for Sale: Step 2 of 2," p. 1 of 1, date printed Jul. 12, 2004.
www.autotrader.com, "Used Cars for Sale: Step 2 of 2," p. 1 of 2, date printed Jul. 12, 2004.
www.autotrader.com, "Used Cars for Sale: Car Details," pp. 1 of 2, date printed Jul. 12, 2004.
www.autotrader.com, "Find Your Car: Search Results," pp. 1 of 2, date printed Jul. 12, 2004.
www.cars.com, "Listings and research to connect you with the right car," pp. 1 of 2, date printed Jul. 12, 2004.
www.cars.com, "Search Results," pp. 1 of 2, date printed Jul. 12, 2004.
www.cars.com, "1989 Ford Mustang LX Sport," pp. 1 of 2, date printed Jul. 12, 2004.
www.carmax.com, "The Online Auto Superstore" Home Page, p. 1 of 1, date printed Jul. 12, 2004.
www.carmax.com, "The Online Auto Superstore: Quick Search," p. 1 of 1, date printed Jul. 12, 2004.
www.carmax.com, "The Online Auto Superstore: Search Results," pp. 1 of 2, date printed Jul. 12, 2004.
www.carmax.com, "The Online Auto Superstore: Clean Title," p. 1 of 1, date printed Jul. 12, 2004.
www-odi.nhtsa.dot.gov, "Office of Defects Investigation," p. 1 of 1, date printed Jul. 14, 2004.
www-odi.nhtsa.dot.gov, "Office of Defects Investigation, Cars/Problems/Recalls," pp. 1 of 2, date printed Jul. 14, 2004.
www.dchusedcars.com, "DCH Auto Group, Used Car CyberLot of New Jersey—Freehold, New Jersey," Inventory, p. 1 of 1, date printed Jul. 15, 2004.
www.dchusedcars.com, "DCH Auto Group, Used Car CyberLot of New Jersey—Freehold, New Jersey," Inventory-results, p. 1 of 1, date printed Jul. 15, 2004.

(56) References Cited

OTHER PUBLICATIONS www.dchusedcars.com, "DCH Auto Group, Used Car CyberLot of New Jersey—Freehold, New Jersey," Certifications, pp. 1 of 3, date printed Jul. 15, 2004.
www.autos.yahoo.com, "New car prices, car pictures, car reviews, used cars, used car prices on Yahoo!," pp. 1 of 3, date printed Jul. 15, 2004.
www.used-cars.autos.yahoo.com, "Fairfax Used Cars BMW—Fairfax VA Used BMW Cars," pp. 1 of 3, date printed Jul. 15, 2004.
www.carprices.com, "Car Prices, New car prices, Used car prices, Auto financing and car research," pp. 1 of 2, date printed Jul. 15, 2004.
www.inventory.carprices.com, Match Maker, p. 1 of 1, date printed Jun. 23, 2003.
www.mbusa.com, "Find Starmark Certified pre owned Mercedes-Benz cars at mbusa.com," p. 1 of 1, date printed Jul. 15, 2004.
www.mbusa.com, Untitled, p. 1 of 1, date printed Jul. 15, 2004.
www.mbusa.com, "Search Results," for 2004 Convertible, pp. 1 of 2, date printed Jul. 15, 2004.
www.autoweb.com, "Used Cars for Sale, New Car Pricing by Autoweb/New and Used Car Prices/Autoweb," pp. 1 of 2, date printed Jul. 15, 2004.
www.web1.intellipriceauto.com, "Identification Page," p. 1 of 1, date printed Jul. 15, 2004.
www.stoneage.com, "Building New Roads for the Automotive Community," p. 1 of 1, date printed Jul. 15, 2004.
www.car.com, "Building New Roads for the Automotive Community," pp. 1 of 2, date printed Jul. 15, 2004.
www.car.com, "New Vehicle Quote Process," pp. 1 of 2, date printed Jul. 15, 2004.
www.car.com, "List My Car for Sale—Step 1," p. 1 of 1, date printed Jul. 15, 2004.
www.car.com, "My Car's Value," pp. 1 of 2, date printed Jul. 15, 2004.
www.car.com, "My Car's Value—Estimate Process, Step 2," pp. 1 of 2, date printed Jul. 15, 2004.
www.car.com, "My Car's Value—Estimate Process, Step 3," pp. 1 of 2, date printed Jul. 15, 2004.
www.carsmart.com, "New and Used Car Prices," pp. 1 of 2, date printed Jul. 14, 2004.
www.web1.intellipriceauto.com, "Identification Page," p. 1 of 1, date printed Jul. 14, 2004.
www.web1.intellipriceauto.com, "Your Vehicle Condition," p. 1 of 1, date printed Jul. 14, 2004.
www.web1.intellipriceauto.com, "Your Contact Information," p. 1 of 1, date printed Jul. 14, 2004.
www.dealernet.com, "The Key to Your Car, Welcome to Dealernet Prices and Reviews," p. 1 of 1, date printed Jul. 15, 2004.
www.dealernet.com, "The Key to Your Car, Trade-In Values, p. 1 of 1," date printed Jul. 15, 2004.
www.dealernet.com, "The Key to Your Car, Trade-In Values for the 2000 Mercury Mystique 4dr Sedan LS," p. 1 of 1, date printed Jul. 15, 2004.
www.dealernet.com, "The Key to Your Car, Trade-In Values for the 2000 Mercury Mystique 4dr Sedan LS with Mileage Adjustment," p. 1 of 1, date printed Jul. 15, 2004.
www2.motorplace.com, "Home Page," p. 1 of 1, date printed Jul. 15, 2004.
www.autobytel.com, "Research," pp. 1 of 2, date printed Jul. 15, 2004.
www.cartrackers.com, "New and Used Car Pricing and Reviews," p. 1 of 1, date printed Jul. 15, 2004.
www.dealerhg.com, "Front Page," p. 1 of 1, date printed Jul. 15, 2004.
www.carfax.com, "Don't buy a used car without Carfax!," p. 1 of 1, date printed Nov. 8, 2004.
www.carfax.com, "Carfax Vehicle History Report," pp. 1-9, date printed Nov. 8, 2004.
Brown, Just How Used is That Used Car? The Washington Post, Aug. 18, 1997, 4 pages.
Meredith Little, Buying and selling a car online. Mac@Home. Louisville: Sep. 1999. vol. 4, Iss. 9;p. 4, 7 pgs.
Interview Materials, Mar. 9, 2009, 16 pages of materials presented during an in-person interview of Mar. 9, 2009.
Maynard, Playing Used-Car Detective, Online, New York Times, Jul. 29, 2001, p. 10, downloaded from Pro-Quest on the Internet on Sep. 13, 2008, 4 pages.
Chrome Inventory Search™, "Match Vehicles They Want to the Vehicle on Your Lot", Chrome Driving Automative Commerce™, www.chrome.com, 2 pgs.
"Target-Based Document-Independent Information Extraction", David W. Embley et al., Brigham Young University, www.deg.byu.edu, 11 pgs.
"A Hierarchical Approach to Wrapper Induction", Ion Muslea et al., University of Southern California, {muslea, minton, knoblock}@isi.edu, 8 pgs.
"Building a Web-Based Search Tool", Andrew Peterson, Updated: Jul. 19, 2001, Article from SQL Server Magazine, 8 pgs.

\* cited by examiner

TOOL FOR SELLING AND PURCHASING VEHICLE HISTORY REPORTS

CROSS-REFERENCE TO RELATED APPLICATIONS

This Application is a continuation of U.S. patent application Ser. No. 12/177,054, filed on Jul. 21, 2008, which claims the benefit of U.S. Provisional Application Ser. No. 61/059,729, filed on Jun. 6, 2008.

BACKGROUND

1. Field

The subject invention relates to online sales of vehicle history reports and, in particular, to tools for increasing sales of vehicle history reports.

2. Related Art

When consumers make choices to purchase vehicles, they often consult vehicle history reports. These vehicle history reports include information that help the consumer make their decision to purchase a vehicle, such as the make, model, and year of the vehicle, the number of previous owners, a status identifier (e.g., accident indicator, or other negative history indicators), etc. When a dealer is selling a vehicle, the dealer often provides the consumer with the vehicle history report associated with the vehicle to assist the consumer with their decision. Some consumers are more likely to purchase vehicles from dealers who provide vehicle history reports, and consumers are more likely to purchase vehicles that have favorable vehicle history reports (i.e., no accidents, few previous owners, etc.)

Dealers get these vehicle history reports from a service that specializes in generating vehicle history reports, such as Carfax which can be accessed at carfaxonline.com. To order vehicle history reports, dealers individually enter each VIN for each desired vehicle, such as specific vehicles in their inventory, to obtain each vehicle history report from the service. This process is cumbersome and dealers, thus, often fail to order reports. Dealers also have little guidance as to how to prioritize report purchases if they prefer not to purchase vehicle history reports for every vehicle.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The inventors developed a batch delivery tool to automatically determine the dealer's retail inventory and automatically provide the vehicle history report for each vehicle in the inventory (without any dealer interaction). The dealers, however, have little control over the number of reports ordered. In addition, the dealers are billed on a per VIN (report) basis, which sometimes causes the dealers to exceed their budget for vehicle history reports.

A hybrid tool for providing vehicle history reports to dealers is described. The tool creates and delivers to the dealer a summary report that includes information about the vehicles in the dealer's inventory for which the dealer has not yet purchased a vehicle history report. The summary report may also include additional information about the vehicles in the inventory, such as whether the vehicles are a certified pre-owned (CPO) vehicle, the number of consumers who have purchased the vehicle history report for a vehicle, the number of consumers who have run record checks for a vehicle, an incident identifier (e.g., accident identifier or other negative history identifiers), etc. The dealer can selectively purchase none, one, several or all of the vehicle history reports corresponding to the vehicles in the summary report. A process for creating and delivering the summary report and selected vehicle history reports is also described.

The summary report, and tools and methods for creating and presenting the summary report, are advantageous because they save dealers a considerable amount of time, but also allow the dealer to save money by selecting only those vehicle history reports that they need or feel are a good investment. The vehicle history report seller can sell more vehicle history reports because the process of purchasing vehicle history reports is much easier and less time consuming than running individual reports. In addition, the list of vehicles in the dealer's inventory is determined proactively, often locating vehicles that are missed by the dealer's internal process. The dealer also does not need to be concerned with purchasing duplicate reports.

According to an aspect of the invention, a method is provided for selling vehicle history reports. The method includes determining a set of vehicles in a dealer inventory; determining a subset of the vehicles in the dealer inventory for which the dealer has not purchased a vehicle history report; presenting a summary report to a dealer, the summary report including information about at least some of the vehicles in the subset of the vehicles; receiving a selection to purchase a vehicle history report for at least one of the vehicles in the summary report; and providing the vehicle history report corresponding to the selection to the dealer.

Determining the set of vehicles in the dealer inventory may include receiving the set of vehicles in the dealer inventory from the dealer.

Determining the set of vehicles in the dealer inventory may include receiving a set of vehicles in the dealer inventory from a third party inventory web site.

Determining the set of vehicles in the dealer inventory may include receiving the set of vehicles in the dealer inventory from the dealer and receiving a set of vehicles in the dealer inventory from a third party inventory web site.

The method may also include presenting a detailed summary report to the dealer, the detailed summary report including a list of the subset of the vehicles.

The summary report may include information about a number of consumers that have accessed a vehicle history report associated with a vehicle in the summary report.

The summary report may include information about a number of consumers that have purchased a vehicle history report associated with a vehicle in the summary report.

The summary report may include information about a number of consumers that have requested a record check associated with a vehicle in the summary report.

The summary report may include information about a number of consumers who accessed the vehicle history report at a web site associated with the dealer.

The summary report may includes information about a number of consumers who accessed the vehicle history report at a web site associated with a third party inventory web site.

Each vehicle may be associated with a vehicle identification number (VIN).

The list of vehicles may include a list of VINs.

Receiving a selection of at least one of the vehicles from the summary report may include receiving a selection of one of the vehicles from the summary report.

Receiving a selection of at least one of the vehicles from the summary report may include receiving a selection of a plurality of the vehicles from the summary report.

Receiving a selection of at least one of the vehicles from the summary report may include receiving a selection of all of the vehicles from the summary report.

Presenting the summary report to the dealer may include presenting a purchase indicator in proximity to each vehicle in the list of vehicles.

Presenting the purchase indicator may include presenting a deselectable purchase indicator.

Receiving a selection of at least one of the vehicles from the summary report may include identifying the vehicles in the list that have the purchase indicator selected.

The deselectable purchase indicator may include a box with a selectively viewable marking.

Receiving a selection of at least one of the vehicles from the summary report may include identifying the vehicles in the list that have the purchase indicator still in proximity to the vehicle identifier.

Providing the vehicle history report corresponding to the selection to the dealer may include providing a plurality of vehicle history reports corresponding to the selection to the dealer.

In accordance with another aspect of the invention, a method is provided for selling vehicle history reports. The method includes accessing a vehicle identification number (VIN) data store to determine an inventory of vehicles of a dealer, each vehicle in the inventory associated with a VIN; accessing a dealer usage data store to identify vehicle history reports purchased by the dealer; identifying a subset of vehicles in the inventory of vehicles of the dealer for which the dealer has not purchased a vehicle history report; and presenting a summary report about the subset of vehicles to the dealer, the summary report allowing a dealer to selectively purchase vehicle history reports corresponding to the vehicles in the summary report.

The summary report may include a list of vehicles with a purchase indicator in proximity to each vehicle in the list of vehicles. The method may also include presenting a detailed summary report about the subset of vehicles to the dealer, the detailed summary report comprising a list of vehicles with a purchased indicator in proximity to each vehicle in the list of vehicles. The purchase indicator may be deselectable.

The method may also include accessing a consumer usage data store; identifying a number of consumers accessing a vehicle history report for each vehicle in the subset of vehicles; associating the number of consumers accessing each vehicle history report with the summary report; and presenting the summary report with the associated number of consumers to the dealer.

Identifying a number of consumers accessing each vehicle in the subset of vehicles may include identifying a number of consumers that purchased the vehicle history report.

Identifying a number of consumers accessing each vehicle in the subset of vehicles may include identifying a number of consumers that requested a record check for a vehicle in the subset of vehicles.

The method may also include accessing a certified pre-owned (CPO) unit data store to identify vehicles that are CPO units. The method may also include presenting information about vehicles that are CPO units in the summary report. The method may also include adding the vehicles that are identified as CPO units to the inventory of vehicles of the dealer.

The method may also include receiving a selection to purchase at least one vehicle history report. The method may also include presenting the purchased vehicle history report to the dealer.

Presenting the list of vehicles may include presenting a list of VINs associated with each vehicle.

In accordance with another aspect of the invention, a system is provided for selling vehicle history reports. The system includes a vehicle identification number (VIN) data store; a dealer usage data store; a summary report data store; and a summary report generation module configured to access the VIN data store, and dealer usage data store to identify vehicle history reports associated with the dealer's inventory for which the dealer has not purchased a vehicle history report, compile data for generate a summary report based on the identified vehicle history reports that the dealer has not purchased and store the compiled data for the summary report, and store the summary report in the summary report data store.

The system may also include a consumer usage data store; and a consumer purchase data store; wherein the summary report generation module is further configured to access the consumer usage data store and consumer purchase data store to identify the vehicles for which consumers have accessed a vehicle history report and compile data for generate the summary report to include an identifier that identifies the vehicles for which consumers have accessed a vehicle history report.

The system may also include a vehicle history report generation module to generate a vehicle history report.

The system may also include a server configured to receive a request to access a summary report from a dealer and generate the summary report for the dealer from the compiled data stored in the summary report data store.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Systems and methods for creating summary reports that allow dealers to selectively purchase vehicle history reports associated with vehicles described in the summary reports are described. The summary reports allow the dealer an opportunity to purchase only the vehicle history reports that are most needed, and may include additional information about each vehicle to aid the dealer in deciding which vehicle history reports to purchase. The summary reports allow the vehicle history report service (e.g., Carfax, accessed at carfaxonline.com) to sell more vehicle history reports. The summary report also make it more convenient for the dealer to run reports on more of their inventory, which may increase consumer confidence, help the dealer turn their inventory faster, etc.

Figure 1:
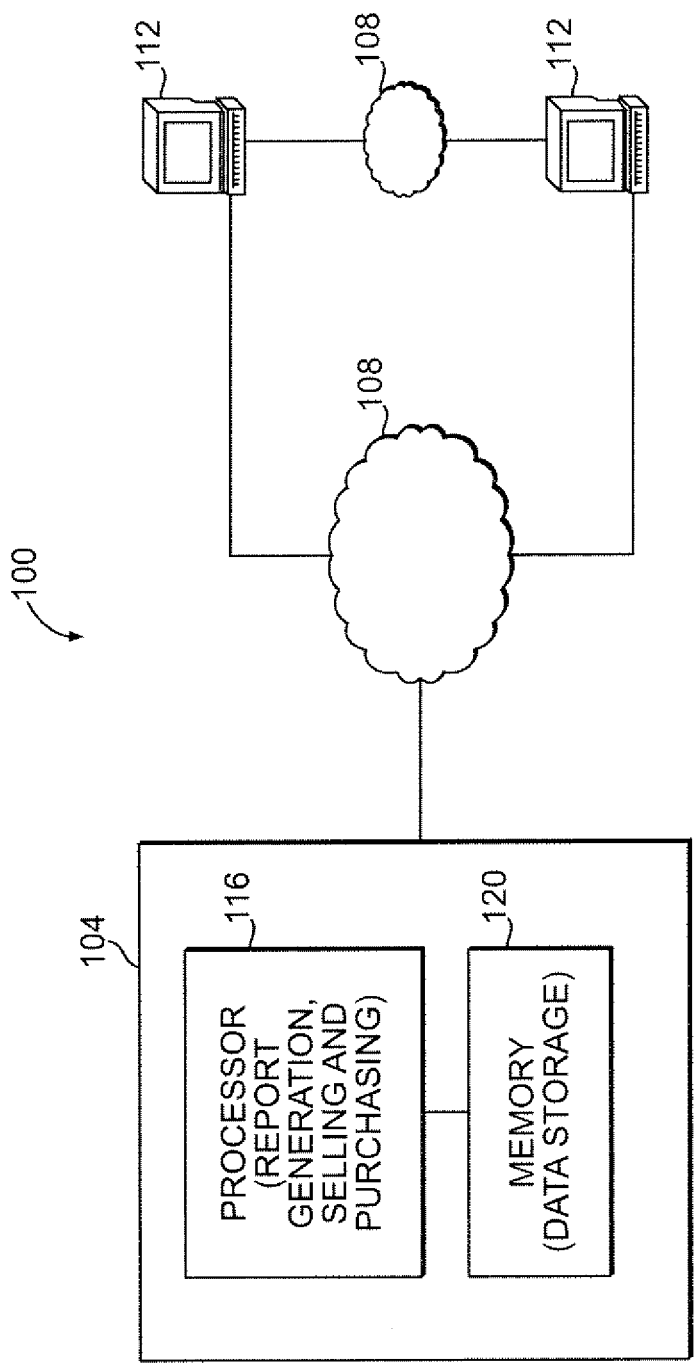
FIG. 1 is a block diagram of a vehicle history report commerce system in accordance with one embodiment of the invention.

An embodiment of the invention will now be described in detail with reference to FIG. 1. FIG. 1 illustrates an exemplary system 100 for buying and selling vehicle history reports and creating and transmitting summary reports. The system 100 includes a server 104, a network 108 and computers 112.

The server 104 is configured to receive requests from computers 112, process the requests and provide responses to the requests to the computers 112. The server 104 may include one or more server computers networked to one another. An exemplary server is the Apache server. The server 104 includes a processor 116 to execute instructions, which is connected to memory 120 that stores data. The processor 116 executes instructions and accesses data in the memory 120 to, for example, generate reports, sell reports to consumers and dealers, allow consumers and dealers and other entities, such as banks, insurance companies, law firms, etc., to purchase reports and transmit reports and selling information to consumers and/or dealers. It will be appreciated that the server 104 may be implemented with any type of hardware and software, and that the server 104 may have a different configuration than shown in FIG. 1. In addition, it will be appreciated that the server 104 may include several server computers connected together.

The network 108 may be any type of communications channel, a local area network (LAN), a wide area network (WAN), such as the Internet, direct computer connections, and the like. The connection may be accomplished in a wireless manner using radio frequency, infrared, or other technologies, using any type of communication hardware and protocols, through other communication mediums, such as electric cable, fire optic cable, and/or through other technologies.

The computers 112 include consumer computers and dealer computers, which access the server 104 through the network 108. It will be appreciated that the consumers may also communicate with the dealers over the network 108. The computer 112 may be a server, a personal computer, a portable computer, a hand held device, a wireless device, and the like. The computer may be a single device at a single location or multiple devices at a single or multiple locations that are connected together using an appropriate communication protocols over any communication medium.

In one embodiment, the server 104 generates a summary report and transmits the summary report to one of the computers 112 associated with a dealer over the network 108. For example, the server 104 may include a website that is accessible by the computer 112 through a web browser located at the computer 112 over the network 108. The website provides the summary report generated for that dealer at the web browser at computer 112. Alternatively, the server 104 may email the summary report to the dealer over the network 108, the email accessible by the computer 112 through the web browser located at the computer 112. The dealer then transmits a request from its computer 112 back to the server 104 over the network 108 indicating a desire to purchase one or more vehicle history reports from the summary report. For example, the dealer may select a link in the web browser that indicates a desire to purchase one or more vehicle history reports. The server 104 then transmits the requested vehicle history report(s) back to the web browser located at the computer 112 from which it received the request.

Figure 2:
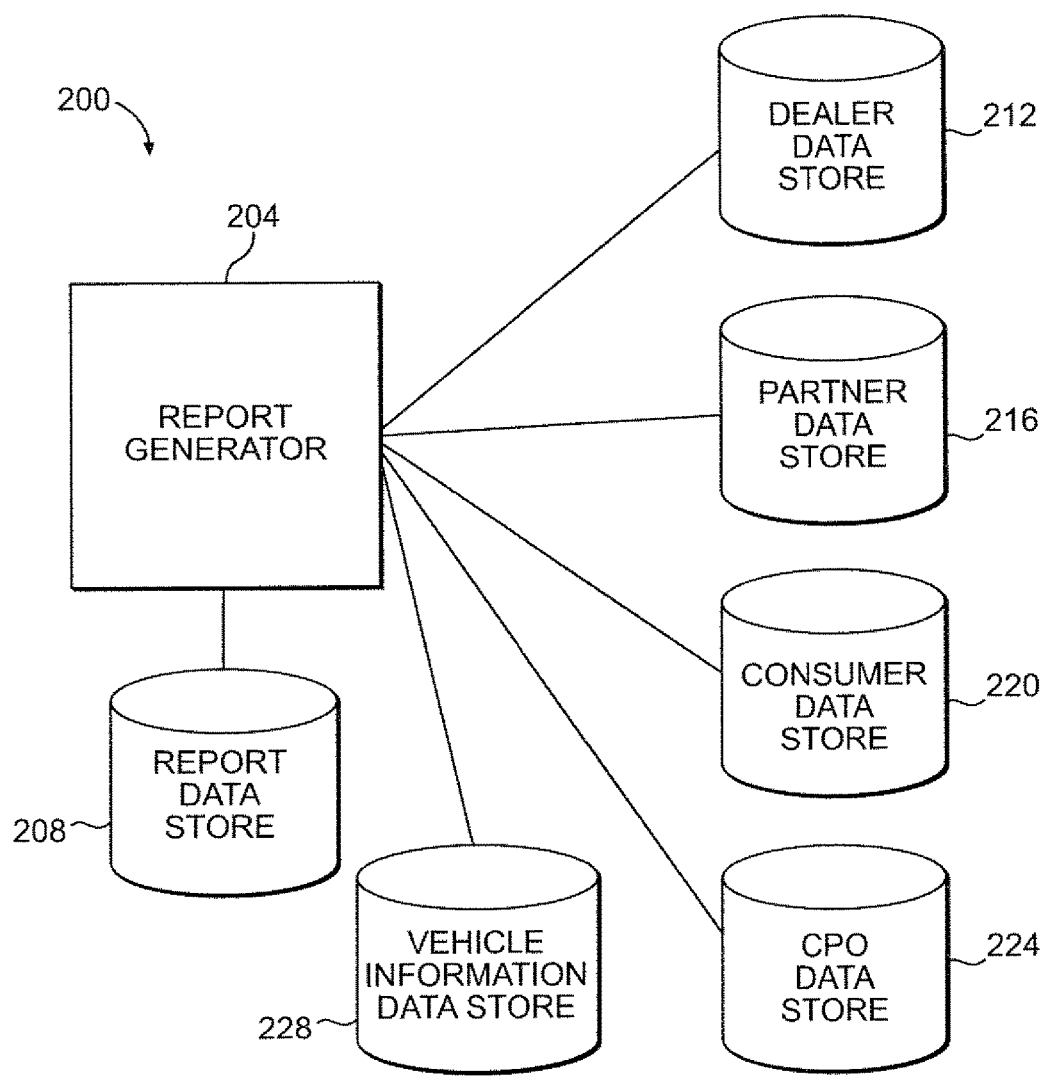
FIG. 2 is a block diagram of a summary report generation system in accordance with one embodiment of the invention.

FIG. 2 illustrates a summary report generation module 200 for generating summary reports. The summary report generation module 200 may be located at the server 100 (see FIG. 1). The summary report generation module 200 may be implemented in any type of hardware and software. The summary report generation module 200 includes a report generator 204, a report data store 208, a dealer data store 212, a partner data store 216, a consumer data store 220, a Certified Pre-Owned (CPO) data store 224, and a vehicle history information data store 228. It will be appreciated that the report generation module 200 may include fewer or additional data stores.

The dealer data store 212 includes data regarding vehicle history reports that the dealer has previously purchased. The dealer data store 212 may also include data regarding the dealer's inventory. Alternatively, another data store may be provided that includes data regarding the dealer's inventory. The dealer data store 212 may include data about vehicle history reports that the dealer has purchased from the service that is generating the summary report and/or third parties.

The partner data store 216 includes data regarding vehicles in a dealer's inventory that is obtained from a third party inventory site. The third party inventory site may be a dealer web host provider or online vehicle listing site that markets the dealer's vehicles online to consumers. For example, the partner data store 216 may include data from third party online vehicle listing sites, such as autotrader.com or cars.com.

The consumer data store 220 includes information about consumer activity related to vehicle history reports. The consumer data store 220 may include information regarding consumer record checks, in which the consumer requests a summary of the vehicle history report. After the consumer runs the record check and reviews the summary of the vehicle history report, the consumer can then decide to purchase the vehicle history report or not. The consumer data store 220 may also include information regarding whether the consumer actually purchased and viewed the vehicle history report. The purchase information may include data regarding consumers who first performed a record check and then purchased the vehicle history report and consumers who directly purchased the vehicle history report (without the record check). It will be appreciated that two separate data stores or databases can be provided (e.g, a record check database and a separate purchase database).

The CPO data store 220 includes information regarding whether vehicles are CPO units. Vehicles are typically identified as CPO according to CPO rules. The CPO rules may be defined by the manufacturer and may include inspection requirements, certain model years, a positive vehicle history reports, etc. The CPO rules may also be defined by state laws.

The vehicle history information data store 228 includes data regarding the VIN of the vehicle, the year, make and model of the vehicle, whether the vehicle has been in accidents, the number of previous owners, etc. In another embodiment, the vehicle history information data may be divided into multiple data stores. For example, a first data store may include the VIN, make, model and year, and a second data store may include information on accidents and previous owners.

The report generator 204 accesses the data in the dealer data store 212, partner data store 216, consumer data store 220, CPO data store 224 and vehicle history information data store 228 to generate the summary reports, which the report generator 204 stores in the report data store 208. In another embodiment, a summary report is not stored in the report data store 208. Instead, the report generator 204 compiles the data from the data stores 212-228 and stores the compiled data in a database in the report data store 208. The summary report is then generated using the data compiled and stored in the database in the report data store 208 (e.g., by the server 104 or the report generator 204 in cooperation with the server 104). The generated summary report or compiled data includes information about the vehicles in the dealer's inventory. The summary report includes a list of each vehicle in the dealer's inventory for which the dealer does not have a vehicle history report. In one embodiment, the summary report may simply summarize some of the contents of the vehicle history reports. For example, the summary report may be: "You have 16 vehicles listed online without a Carfax report—6 of which are 1-owner and 3 have accidents or other incidents." In another embodiment, the summary report includes information about the number of owners, number of accidents, consumer information, and the like, adjacent to each vehicle in the list. It will be appreciated that the summary report may include both the summarized content and the specific information for each vehicle in the list.

It will be appreciated that the report generator 204 does not need to access all of the dealer data store 212, partner data store 216, consumer data store 220, CPO data store 224 and vehicle history information data store 228 to generate summary reports. For example, a summary report can be generated using only the data in the dealer data store 212. If the dealer provides data regarding their inventory, and the dealer data store 212 also includes information regarding the previously purchased vehicle history reports, then the report generator 204 can generate a summary report that only includes information regarding the subset of vehicles in the dealer inventory for which the dealer has not previously purchased a vehicle history report using the dealer data store 212. In another example, the summary report can be generated using only the data in the dealer data store 212 and the partner data store 216. The data in the partner data store 216 can be used to determine the set of vehicles in the dealer's inventory, and the data in the dealer data store can be used to determine the subset of vehicles for which the dealer has not purchased a vehicle history report. It will be appreciated that other combinations of accessing data from the data stores can be accessed by the report generator 204 to generate the summary report.

In addition, although the data stores 212-228 are referred to as data stores that store data, it will be appreciated that the data stores may store databases of the data that can be accessed by the report generator 204. For example, each of the data stores 212-228 may be organized according to the vehicle identification number (VIN) of each vehicle.

Figure 3:
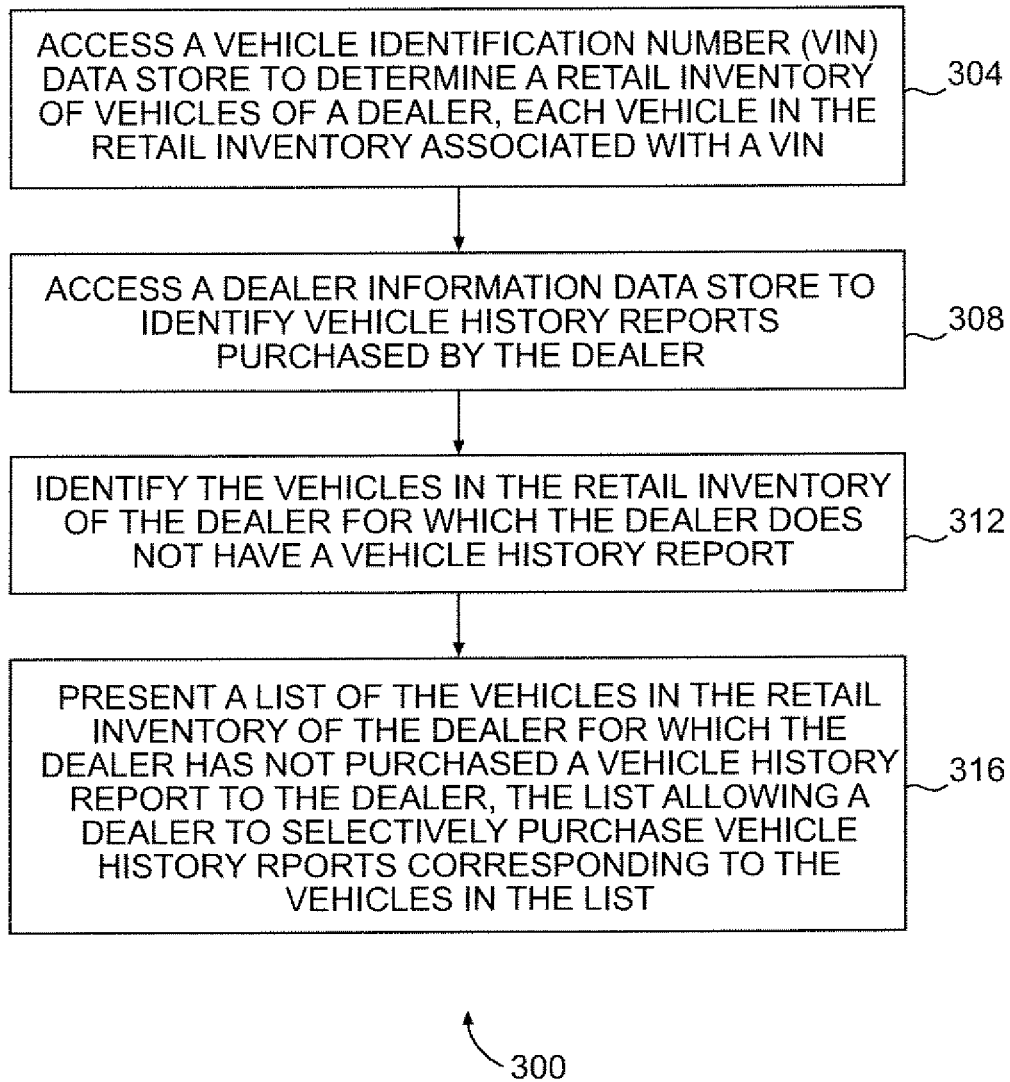
FIG. 3 is a flow diagram of a method for generating a summary report in accordance with one embodiment of the invention.

FIG. 3 illustrates a process 300 for generating a summary report in accordance with one embodiment of the invention. It will be appreciated that the process 300 described below is merely exemplary and may include a fewer or greater number of steps, and that the order of at least some of the steps may vary from that described below.

The process 300 begins by accessing a vehicle identification number (VIN) data store to determine a retail inventory of vehicles of a dealer, each vehicle in the retail inventory associated with a VIN (block 304). For example, with reference to FIG. 2, the report generator 204 accesses the partner data store 216 to determine the retail inventory. In another example, if the dealer has provided their retail inventory to the server, the report generator 204 accesses the dealer data store 212.

With reference back to FIG. 3, the process 300 continues by accessing a dealer information data store to identify vehicle history reports purchased by the dealer (block 308). For example, with reference again to FIG. 2, the report generator 204 accesses the dealer data store 212 to identify the vehicle history reports purchased by the dealer.

Referring to FIG. 3, the process 300 continues by identifying the vehicles in the retail inventory of the dealer for which the dealer does not have a vehicle history report (block 312). For example, the report generator 204 compares the retail inventory data from the partner data store 216 or the dealer data store 208 with the purchase data from the dealer data store 212 to identify the vehicles in the retail inventory for which the dealer does not have a vehicle history report.

Referring again to FIG. 3, the process 300 continues by presenting a list of vehicles in the retail inventory of the dealer for which the dealer has not purchased a vehicle history report to the dealer, the list allowing a dealer to selectively purchase vehicle history reports corresponding to the vehicles in the list (block 316). For example, with reference to FIGS. 1 and 2, the summary report generated by the report generator 204 at the server 104 is transmitted over the network 108 to a computer 112 associated with the dealer.

Figure 4:
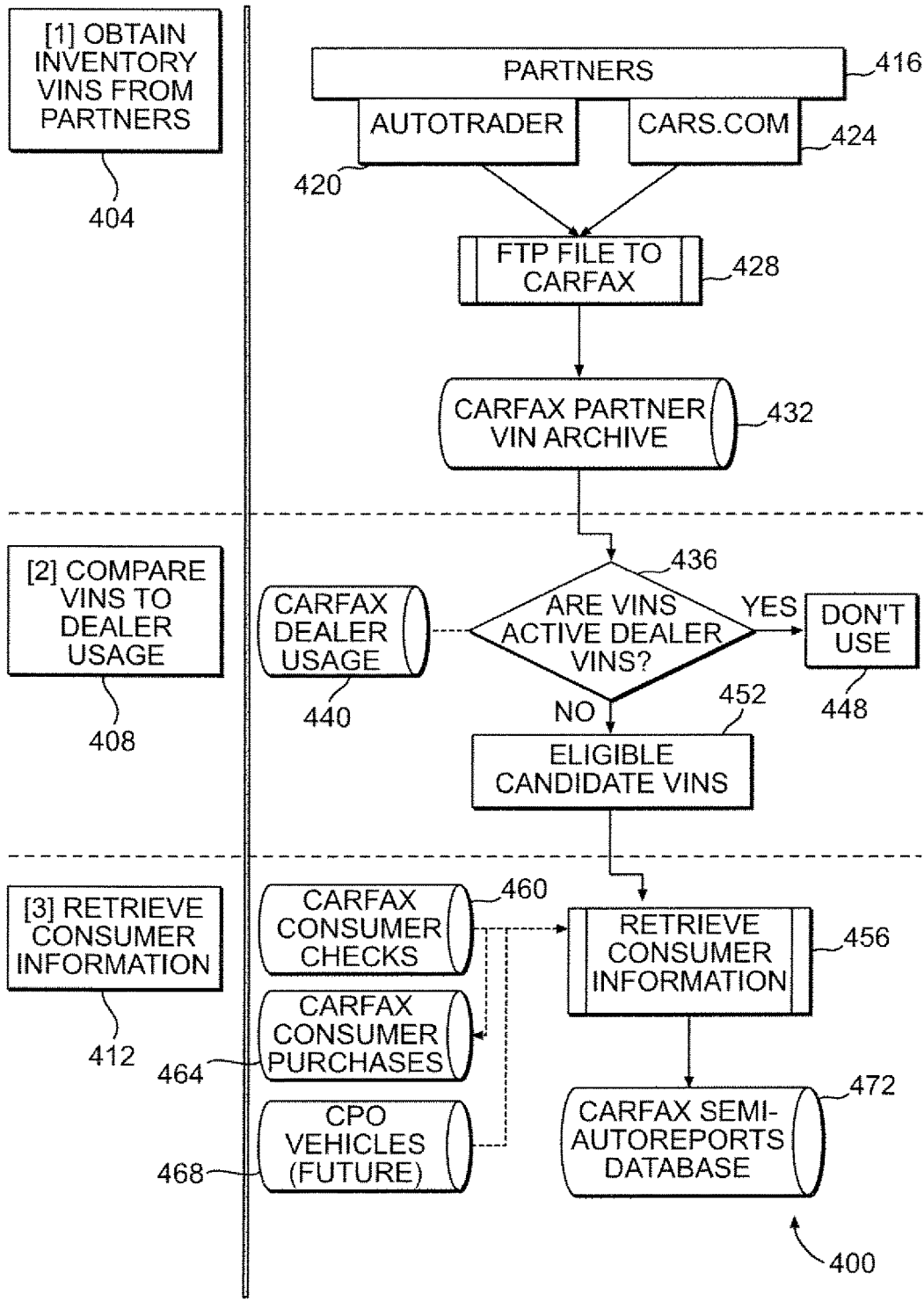
FIG. 4 is a flow diagram of a detailed method for generating a summary report in accordance with one embodiment of the invention.

FIG. 4 illustrates a detailed process 400 for generating a summary report in accordance with one embodiment of the invention. It will be appreciated that the process 400 described below is merely exemplary and may include a fewer or greater number of steps, and that the order of at least some of the steps may vary from that described below. The process 400 includes obtaining inventory VINs from partners (block 404), comparing the inventory VINs to dealer usage (block 408) and retrieving consumer information (block 412).

Obtaining inventory VINS from partners (block 404) includes accessing data from partners 416. These partners 416 may include for example, AutoTrader 420 and cars.com 424, etc. In one embodiment, the inventory VINS are obtained by receiving an ftp file 428 at the server from the partners 416. The ftp file 428 is stored in a partner data store (e.g., the Partner VIN Archive 432).

Comparing the inventory VINS to dealer usage (block 408) includes determining whether VINS are active dealer VINS 436 using the Dealer Usage data stored in the Dealer Usage data store 440. If the VINS are active, then the VINS are not used 448. If the VINS are not active, then the VINS are eligible candidate VINS 452.

Retrieving consumer information (block 412) includes retrieving consumer information 456. The consumer information may include consumer checks 460, consumer purchases 464 and CPO vehicles 468. The retrieved consumer information 456 is then stored in the Semi-AutoReports Database 472. The data in the Semi-Auto Reports Database 472 can be used to generate a summary report.

Figure 5:
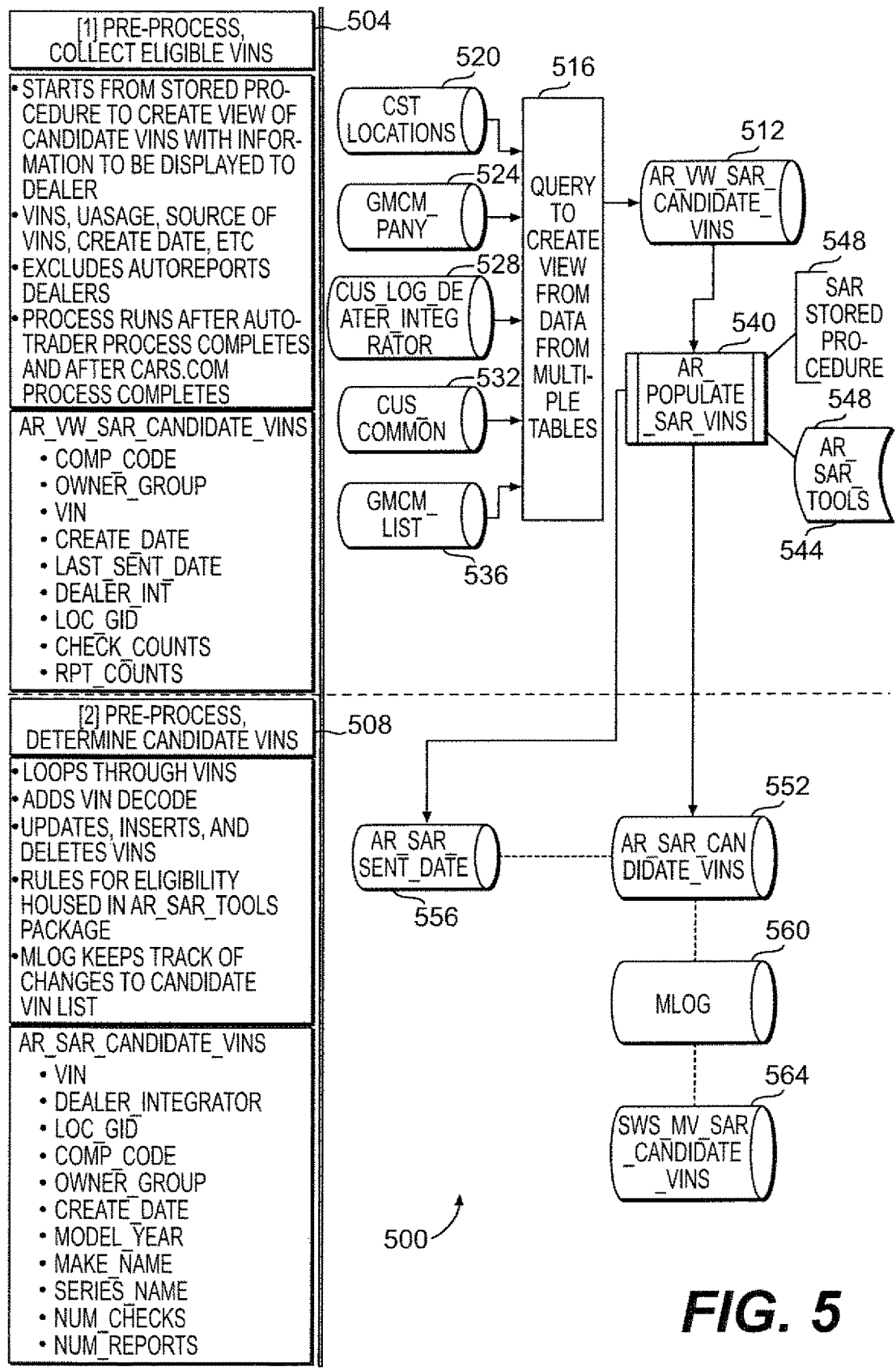
FIG. 5 is a flow diagram of a detailed method for generating a summary report in accordance with one embodiment of the invention.

FIG. 5 illustrates a process 500 for determining candidate VINS in further detail. It will be appreciated that the process 500 described below is merely exemplary and may include a fewer or greater number of steps, and that the order of at least some of the steps may vary from that described below. The process 500 includes pre-processing and collecting eligible VINS (block 504) and pre-processing and determining candidate VINS (block 508). The candidate VINS are the VINS in the dealer inventory for which the dealer has not purchased a vehicle history report.

Pre-processing and collecting eligible VINS (block 504) starts from a stored procedure to create a view of candidate VINS with information to be displayed to the user. The data includes VINS, usage, source of VINS, create date, etc. If the inventory data comes from partner data, the procedure runs after the partner (e.g., autotrader.com and/or cars.com) process completes.

The AR_VW_SAR_Candidate Vins 512 may include the following data: comp_code, owner group, VIN, create data, last sent date, dealer int, loc gid, check counts and rpt counts. A query to create a view from data stored in multiple tables 516 is performed to generate the candidate VINs. The multiple tables include CST locations 520, GMCM_PANY 524 (e.g., dealer demographics data store), CUS_LOG_DEALER_INTEGRATOR 528 (e.g., tracking data store to collect VINs by inventory partner), CUS_COMMON 532 (e.g., service (e.g., Carfax) usage data store) and GMCM_LIST 536 (e.g., data store to collect a dealer's relationship with third party partners (i.e., dealer IDs).

The data for the summary report is compiled using the AR POPULATE SAR VINS process 540, which access the AR SAR TOOLS 544 and the SAR STORED PROCEDURE 548.

The pre-processing and determining candidate VINs 508 includes transmitting the data for the summary reports to the AR_SAR_CANDIDATE_VINS data store 552. The date the candidate VINs were sent may also be stored in the AR_SAR_SENT_DATE data store 556. The date the candidate VINs were sent from the partner can be used by the AR SAR TOOLS rules for eligibility to determine whether the VINs are eligible for SAR. The process 508 loops through the VINs, adds VIN Decode, updates, inserts and deletes VINS based on the rules for eligibility in the AR SAR TOOLS packages. MLOG 560 keeps track of changes to the candidate VIN list. The data is stored in the SWS MV SAR CANDIDATE VINS 564, which includes information regarding VIN, dealer_integrator (e.g., code identifying inventory partners)), LOC_GID (e.g., a unique identifier for a particular dealer location), COMP_CODE (e.g., an alphanumeric code used to uniquely identify a dealer), OWNER_GROUP (e.g., name of the owner group, if any, that owns the dealer), CREATE_DATE (e.g., date the VIN first showed up in the partner data files as a retail vehicle), MODEL_YEAR, MAKE_NAME, SERIES_NAME, NUM_CHECKS (e.g., number of consumers requesting a vehicle history report via a record check search for a particular VIN) and NUM_REPORTS (e.g., number of consumers purchasing a vehicle history report for a particular VIN).

Figure 6:
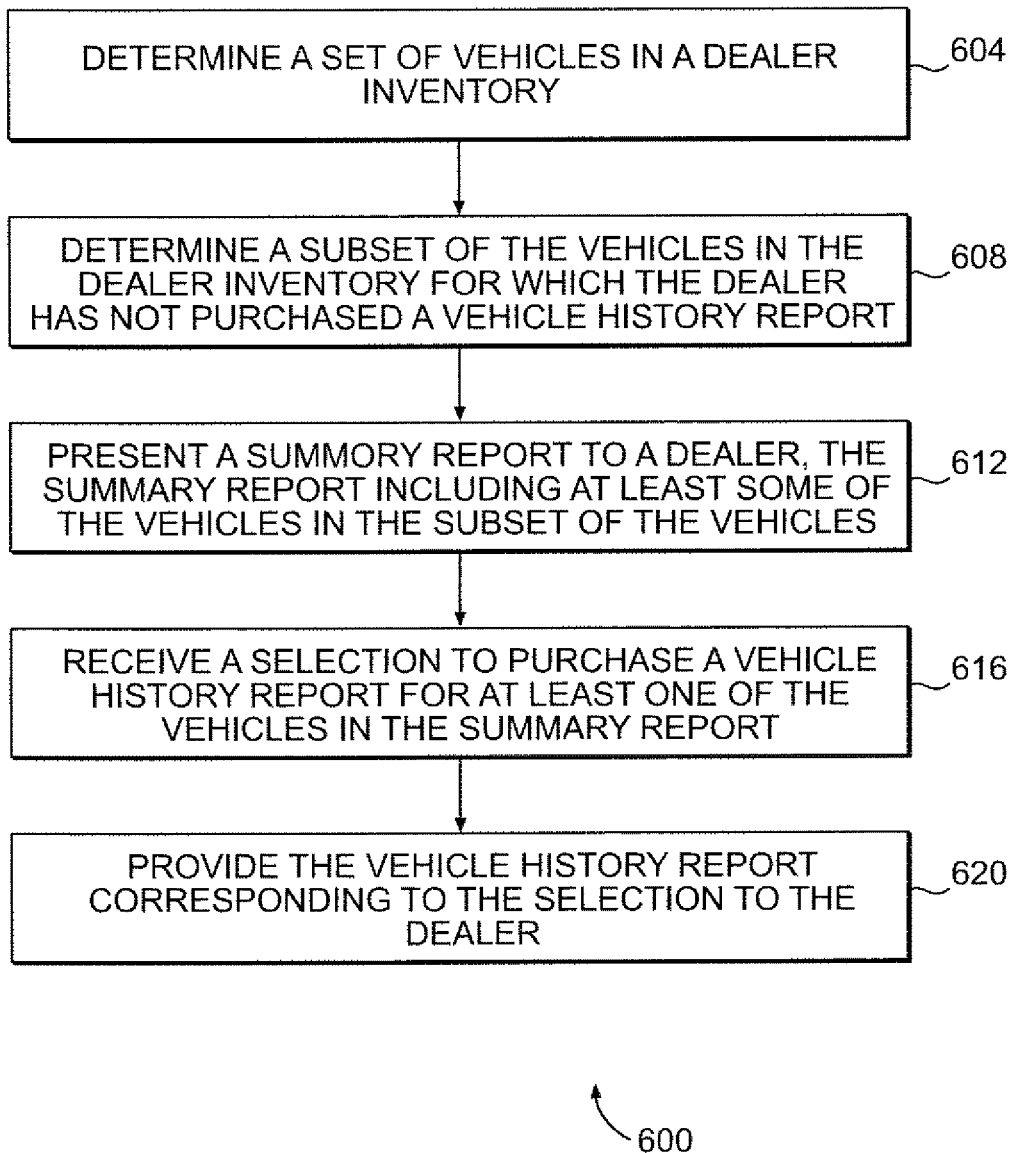
FIG. 6 is a flow diagram of a method for selling vehicle history reports in accordance with one embodiment of the invention.

FIG. 6 illustrates a process 600 of selling and purchasing vehicle history reports using the summary report. It will be appreciated that the process 600 described below is merely exemplary and may include a fewer or greater number of steps, and that the order of at least some of the steps may vary from that described below.

The process 600 begins by determining a set of vehicles in a dealer inventory (block 604). For example, with reference to FIG. 2, the report generator 204 accesses the partner data store 216 to determine the retail inventory. In another example, if the dealer has provided their retail inventory to the server, the report generator 204 accesses the dealer data store 212.

Referring back to FIG. 6, the process 600 continues by determining a subset of the vehicles in the dealer inventory for which the dealer has not purchased a vehicle history report (block 608). For example, the report generator 204 compares the retail inventory data from the partner data store 216 or the dealer data store 212 with the purchase data from the dealer data store 212 to identify the vehicles in the retail inventory for which the dealer does not have a vehicle history report.

The process 600 continues by presenting a summary report to a dealer, the summary report including at least some of the vehicles in the subset of the vehicles (block 612). For example, with reference to FIGS. 1 and 2, the summary report generated by the report generator 204 at the server 104 is transmitted over the network 108 to a computer 112 associated with the dealer.

The process 600 continues by receiving a selection to purchase a vehicle history report for at least one of the vehicles in the summary report (block 616). For example, with reference to FIG. 1, the dealer at the computer 112 transmits a request to purchase a vehicle history report for at least one of the vehicles in the summary report to the server 104 over the network 108.

The process 600 continues by providing the vehicle history report corresponding to the selection to the dealer (block 620). For example, with reference to FIG. 1, the server 104 receives the purchase request, processes the request to generate a vehicle history report, and transmits the vehicle history report corresponding to the request back to the dealer at the computer 112 over the network 108.

Figure 7:
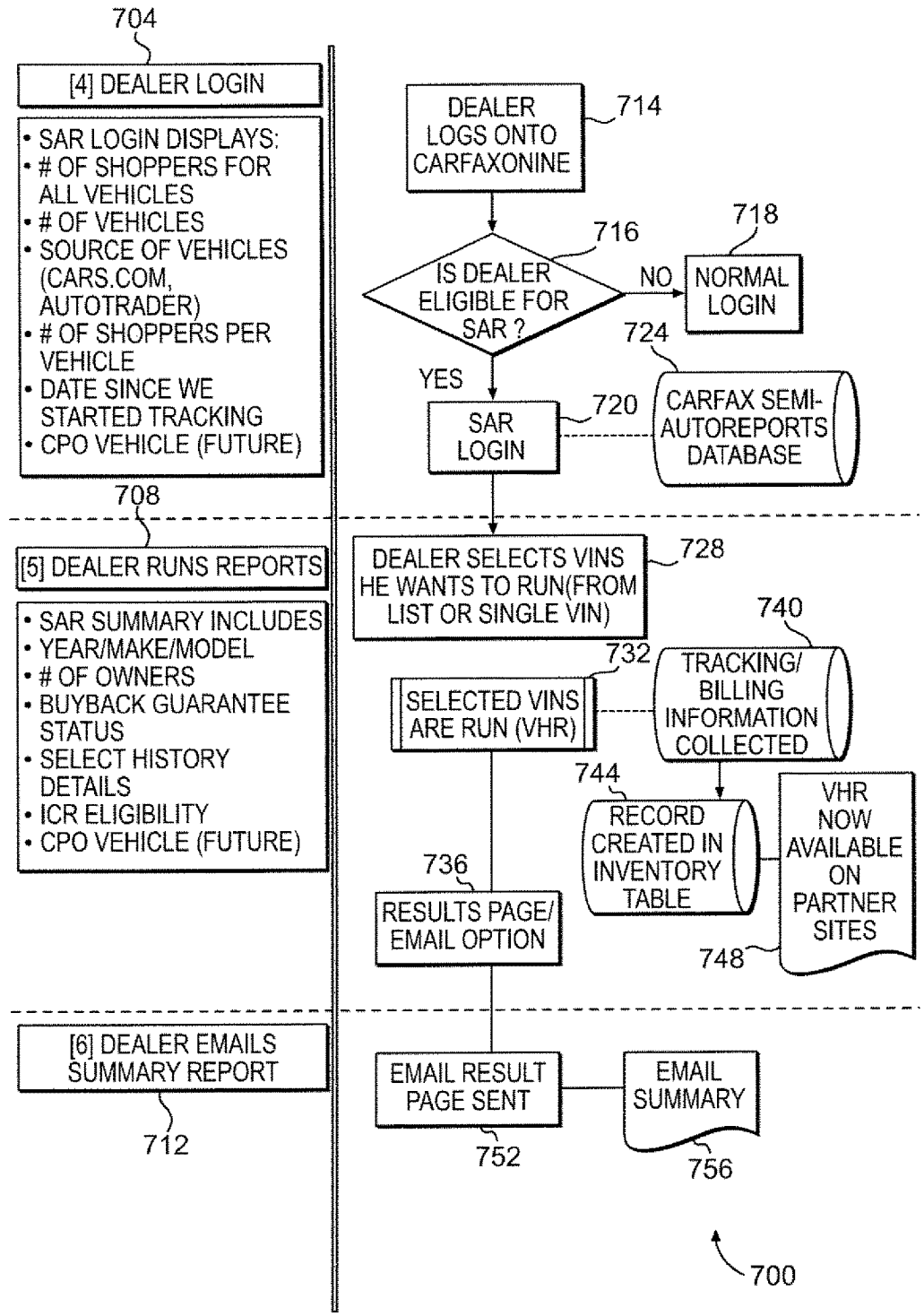
FIG. 7 is a flow diagram of a detailed method for selling vehicle history reports in accordance with one embodiment of the invention.

FIG. 7 illustrates a process 700 for selling and purchasing summary reports in further detail in accordance with one embodiment of the invention. It will be appreciated that the process 700 described below is merely exemplary and may include a fewer or greater number of steps, and that the order of at least some of the steps may vary from that described below. The process 700 includes a dealer login process (block 704), a summary report purchase process (block 708) and an email summary report process (block 712).

The dealer login process 704 may include the dealer logging onto carfaxonline.com (block 714). It is then determined whether the dealer is eligible for a summary report (SAR) 716. If the dealer is not eligible for SAR, then the dealer proceeds with a normal login process 718. If the dealer is eligible, then the dealer proceeds to the SAR login 720, which accesses the Semi-Auto Reports database 724. From the dealer perspective, the dealer either has a normal login experience or the SAR summary report is presented to the dealer if the dealer is eligible for the SAR summary report and there are vehicles in the SAR summary report.

Figure 9A:
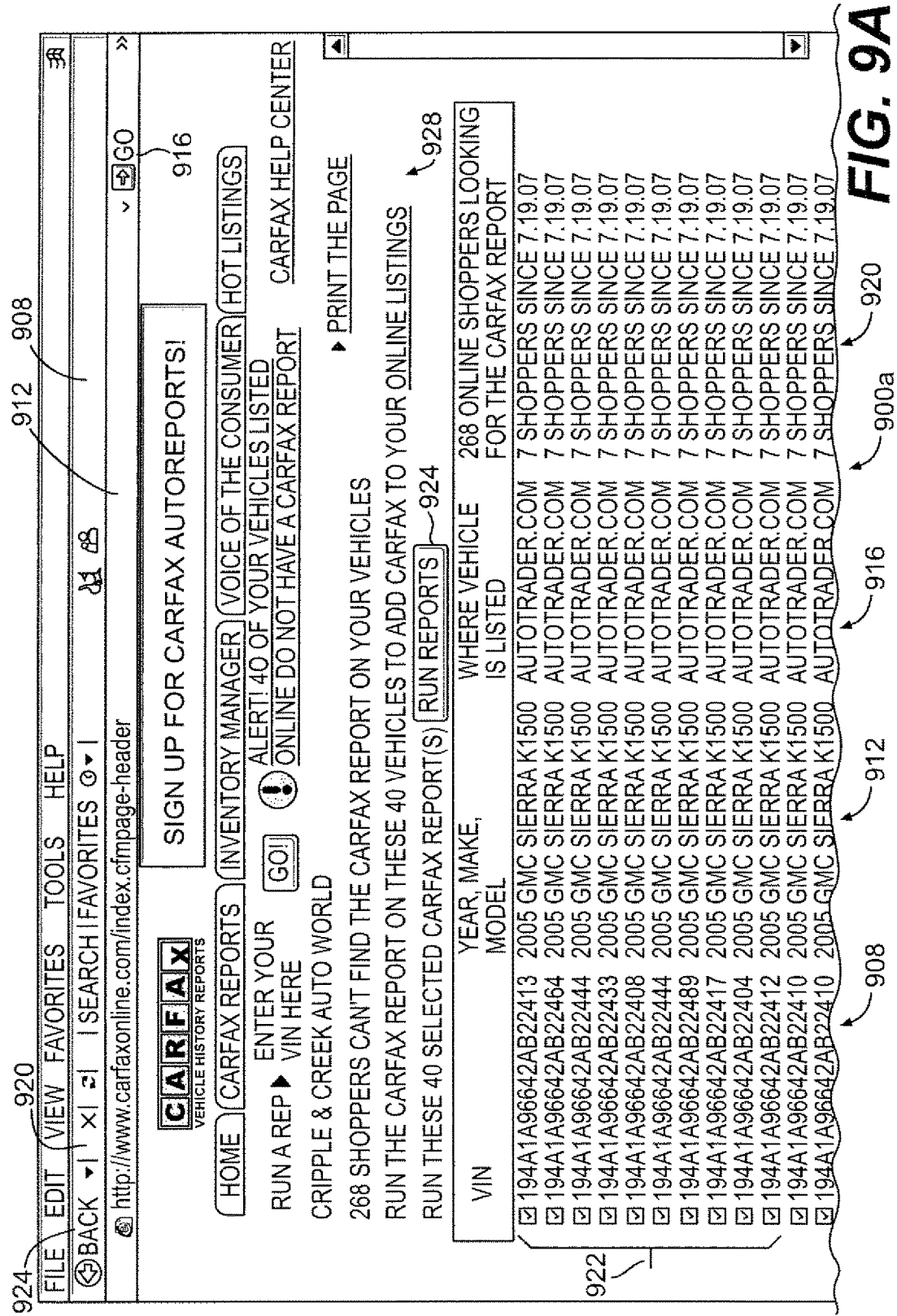
FIGS. 9A-B are schematic views of a summary report in accordance with one embodiment of the invention.
Figure 9B:
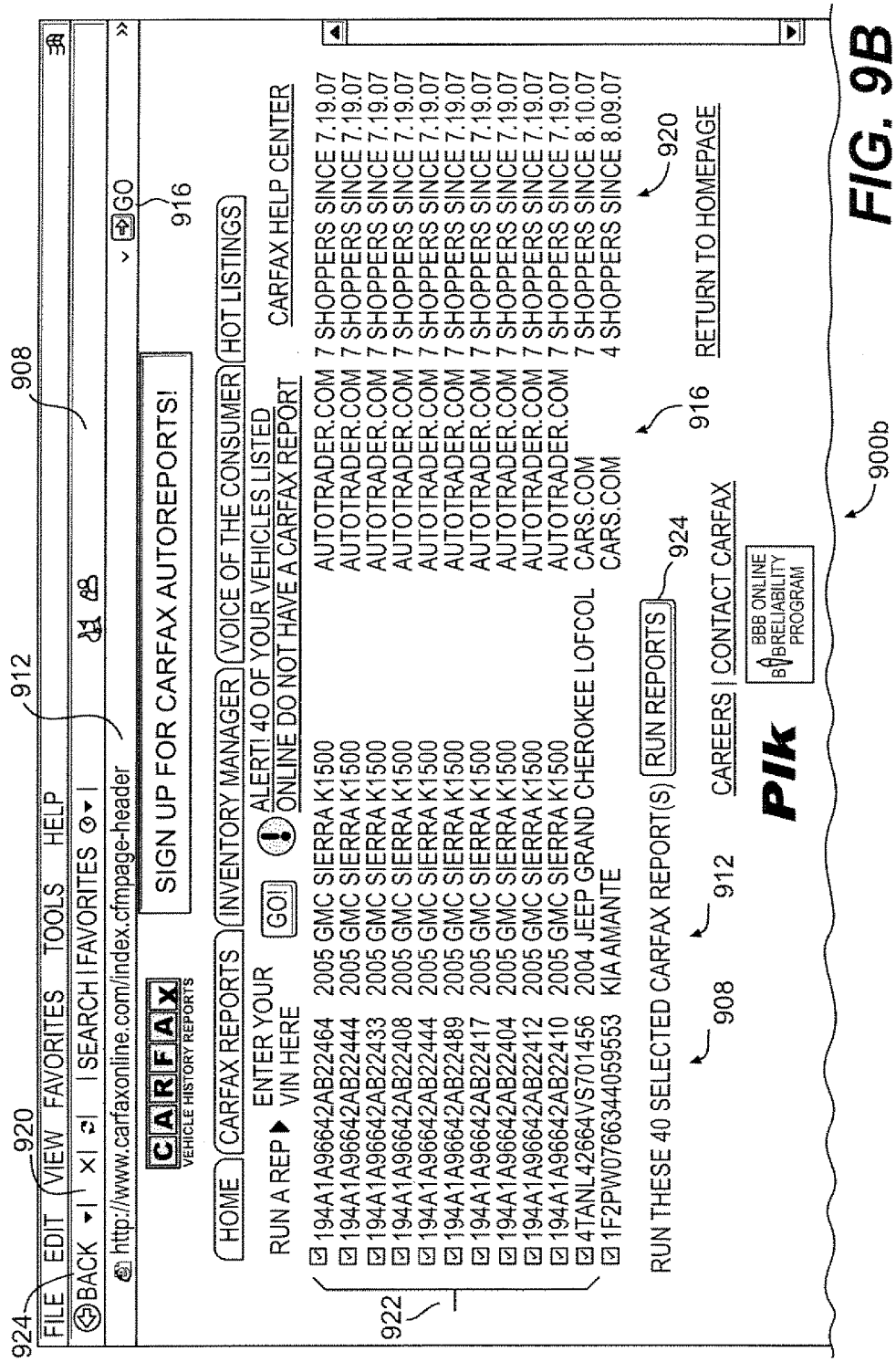

The SAR summary presented to the dealer may include one or more of the VIN, year/make/model of the vehicles, the source of the VIN (e.g., autotrader.com and/or cars.com), the date the VIN was located online, the number of consumer purchases, the number of consumer record checks, the number of owners, the buyback guarantee status, select history details (e.g., accidents, etc.), ICR eligibility and CPO vehicle data. (FIGS. 9A-9B illustrate an exemplary SAR summary).

Figure 9C:
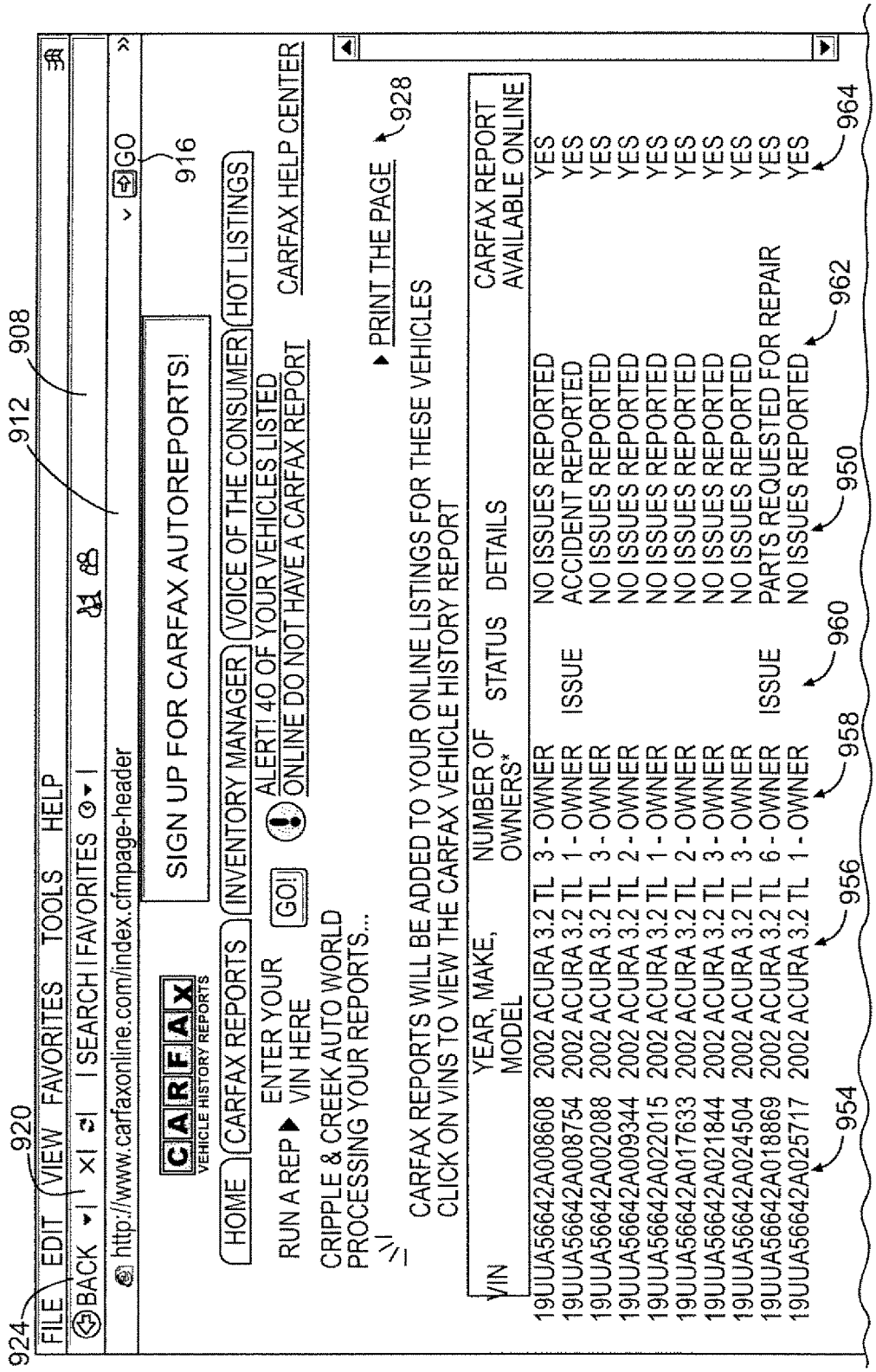
FIG. 9C is a schematic view of a receipt page in accordance with one embodiment of the invention.

The summary report purchase process 708 includes receiving a dealer selection of VINs associated with vehicle history reports to purchase 728. The selected VINs are run 732 and the results page/email option 736 is presented to the dealer, including the selected vehicle history reports. (FIG. 9C illustrates an exemplary results page). The vehicle history reports typically include one or more of the VIN, year/make/model of the vehicles, the number of owners, the buyback guarantee status, select history details (e.g., accidents, etc.), ICR eligibility and CPO vehicle data. When the selected VINS are run, the tracking/billing information is also collected 740. A record is created in the inventory table 744, and the vehicle history report (VHR) is made available on partner sites 748 (e.g., autotrader.com and/or cars.com).

If the dealer selects the email option 736, then the process proceeds to the email summary report process 712 and the email result page is sent 752. The information in the email is saved into a email summary database.

FIGS. 8A-8F illustrate a detailed process for selling and purchasing summary reports 800 in accordance with one embodiment of the invention. It will be appreciated that the process 800 described below is merely exemplary and may include a fewer or greater number of steps, and that the order of at least some of the steps may vary from that described below. As shown in FIGS. 8A-8F, the process 800 includes dealer logs in (block 802), a list of VINs displayed (block 804), dealer clicks on links (block 806), dealer submits a batch of VINs (block 808), dealer submits an email request for a batch of VINS (block 810) and change home page default (block 812).

Figure 8A:
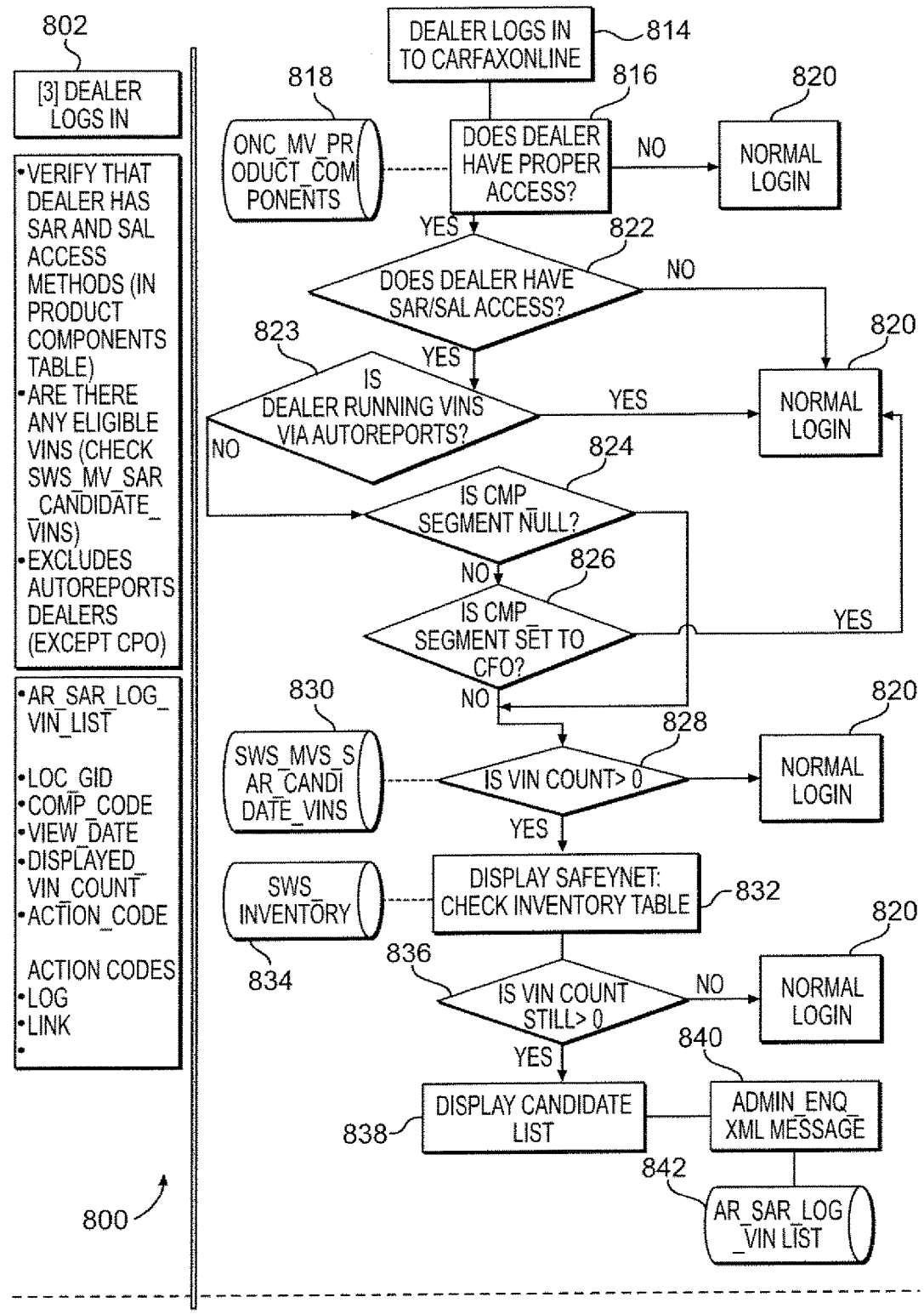
FIGS. 8A-8E are flow diagrams of a detailed method for selling vehicle history reports in accordance with one embodiment of the invention.

With reference to FIG. 8A, when the dealer logs in (block 802), the system verifies that the dealer has SAR and SAL access methods and determines if there are eligible VINS, excluding Auto Reports dealers. SAR and SAL are codes attached to the Dealer profile in the database that determines if the dealer is presented with SAR. When that dealer purchases via the SAR process, the activity is written to usage with the code SAR if the dealer purchased the reports as part of a 'batch' of several VINs at a time, and the activity is written to usage with the code SAL if they purchased reports on an individual basis from the SAR summary. In particular, the dealer logs in to carfaxonline.com 814. It is determined whether the dealer has proper access 816 by accessing the onc_mv_product_components data store 818. If no, the dealer proceeds to normal login 820. If yes, it is determined whether the dealer has SAR/SAL access 822. If no, the process proceeds to normal login 820. If yes, it is determined whether the dealer is running VINS via autoreports 823. If yes, the process proceeds to normal login 820. If no, it is determined whether cmp_segment is null 824 and if the cmp_segment is set to CFO 826. If the cmp_segment is set to CFO, the process proceeds to normal login. If the cmp_segment is null and the cmp_segment is not set to CFO, the process proceeds to determine if the VIN count is greater than 0 (828) by accessing SWS_MV_SAR_Candidate VINS 830. If no, the process proceeds to normal login 820. If yes, then the safety net is displayed 832. The inventory table is checked by accessing the SWS inventory data store 834. The process continues to determine if the VIN Count is still greater than 0 836. If no, the process proceeds to normal login 820. If yes, the candidate list is displayed 838 and an admin_enq_xml_message 840 is also displayed using the AR_SAR_log_VIN_list data store 842.

Figure 8B:
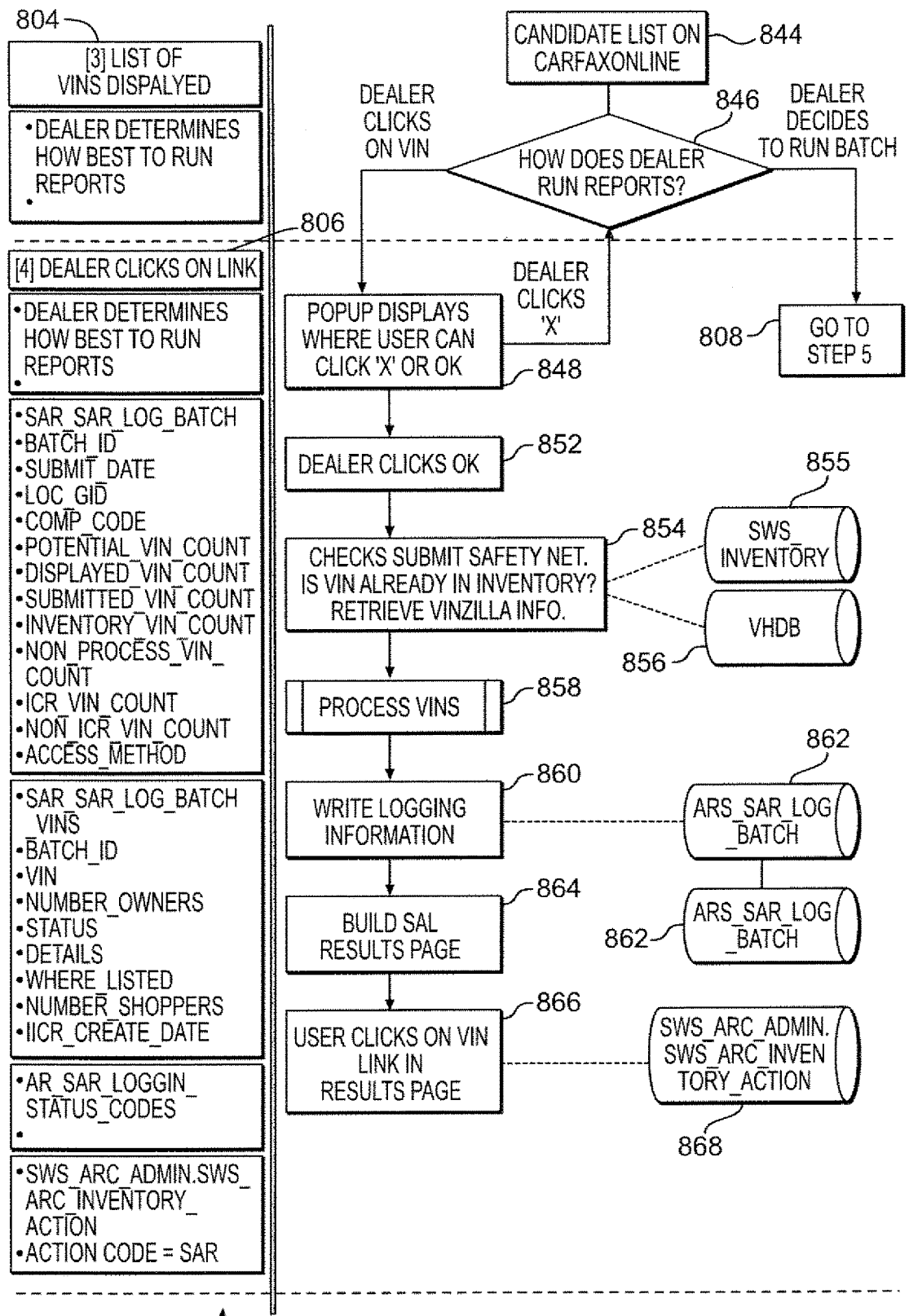

As shown in FIG. 8B, the list of VINs is displayed 804 by displaying the candidate list online 844. The dealer determines how best to run the vehicle history reports. It is determined how the dealer runs the reports 846. If the dealer decides to run a batch 808, the process proceeds to the process shown in FIG. 8C. If the dealer chooses to run only specific VINs, the process continues by the dealer clicking on links 806.

The dealer clicking on links 806 process begins by providing popup displays where the user can click "x" or Ok 848. For example, after a dealer clicks a VIN (the link), a popup confirmation window is displayed that confirms "Do you want to purchase this report"—to which the dealer can answer OK to run the report or 'cancel' ("X") to not run the VIN. If the dealer selects X, the process returns to displaying the list of candidate VINs 804. If the dealer selects ok 852, the process continues by checking the submit safety net 854, which includes determining whether the VIN is in inventory and retrieving VIN information 854 from the SWS inventory data store 855 and the VHDB 856. The VINs are then processed which includes generating a vehicle history report for each VIN and writing the results into a dealer usage store 858 and logging information is written 860 using the AR_SAR_log_batch databases 862. The SAL results page is then built 864. The user selects on VIN link in the results page 866 accessing the admin SWS ARC inventory action data store 868. The user proceeds to choose email options 810.

Figure 8C:
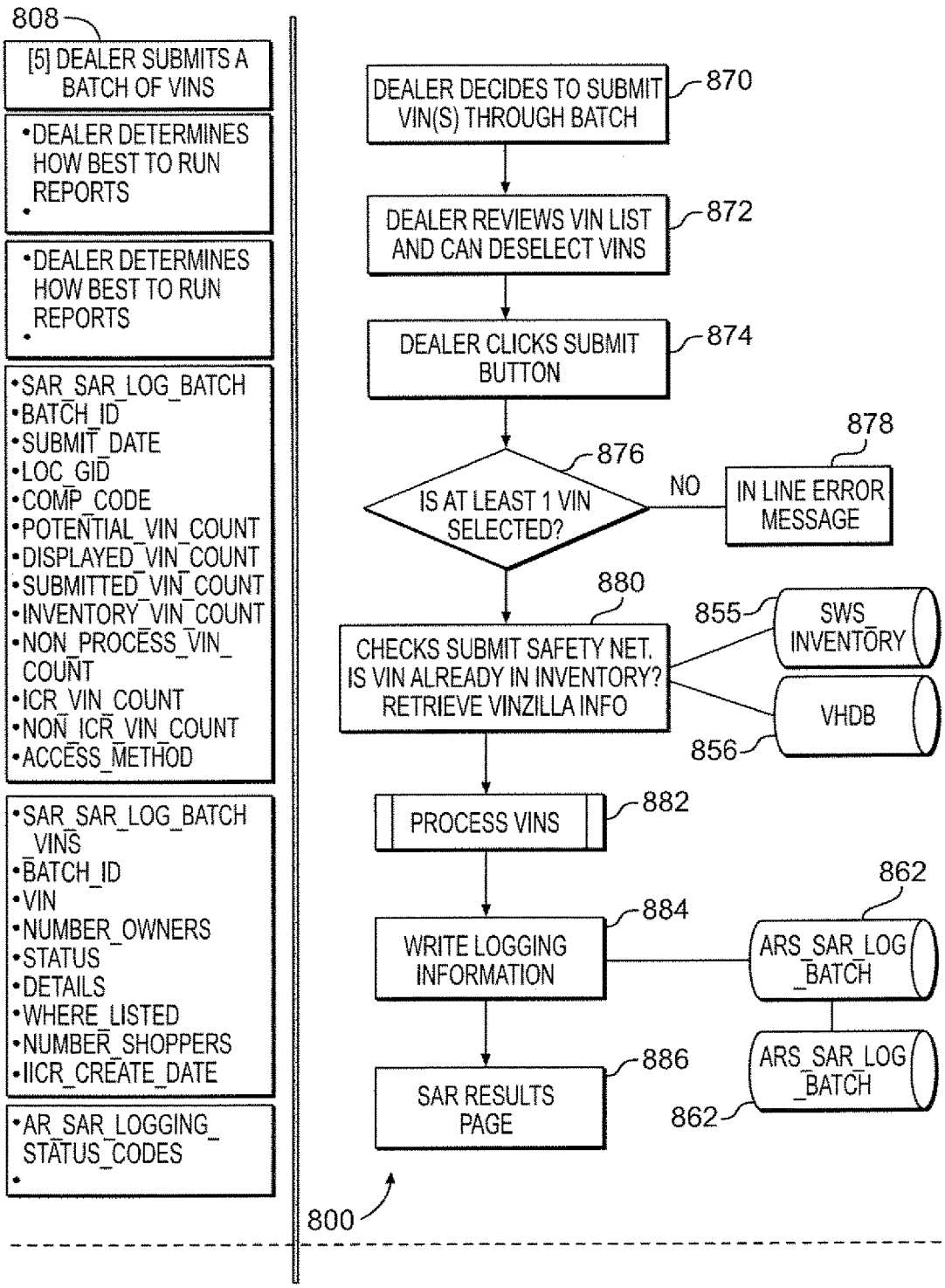

Referring to FIG. 8C, the process continues here only if the dealer selected to run VINs in a batch 846. The dealer reviews the VIN list and can choose to run all VINs or deselect VINs 872, and clicking the submit button 874. The process continues by determining if at least one VIN is selected 876. If no, an in line error message is returned 878. If yes, the checks submit safety net is processed 880 using the sws_inventory 854 and vhdb 856. The process continues by processing the VINs which includes generating a vehicle history report for each VIN and writing the results into a dealer usage store 882. The log information is written 884 using the AR_SAR_log_batch databases 862. The process generates a SAR results page 886. The user proceeds to choose email options 810.

Figure 8D:
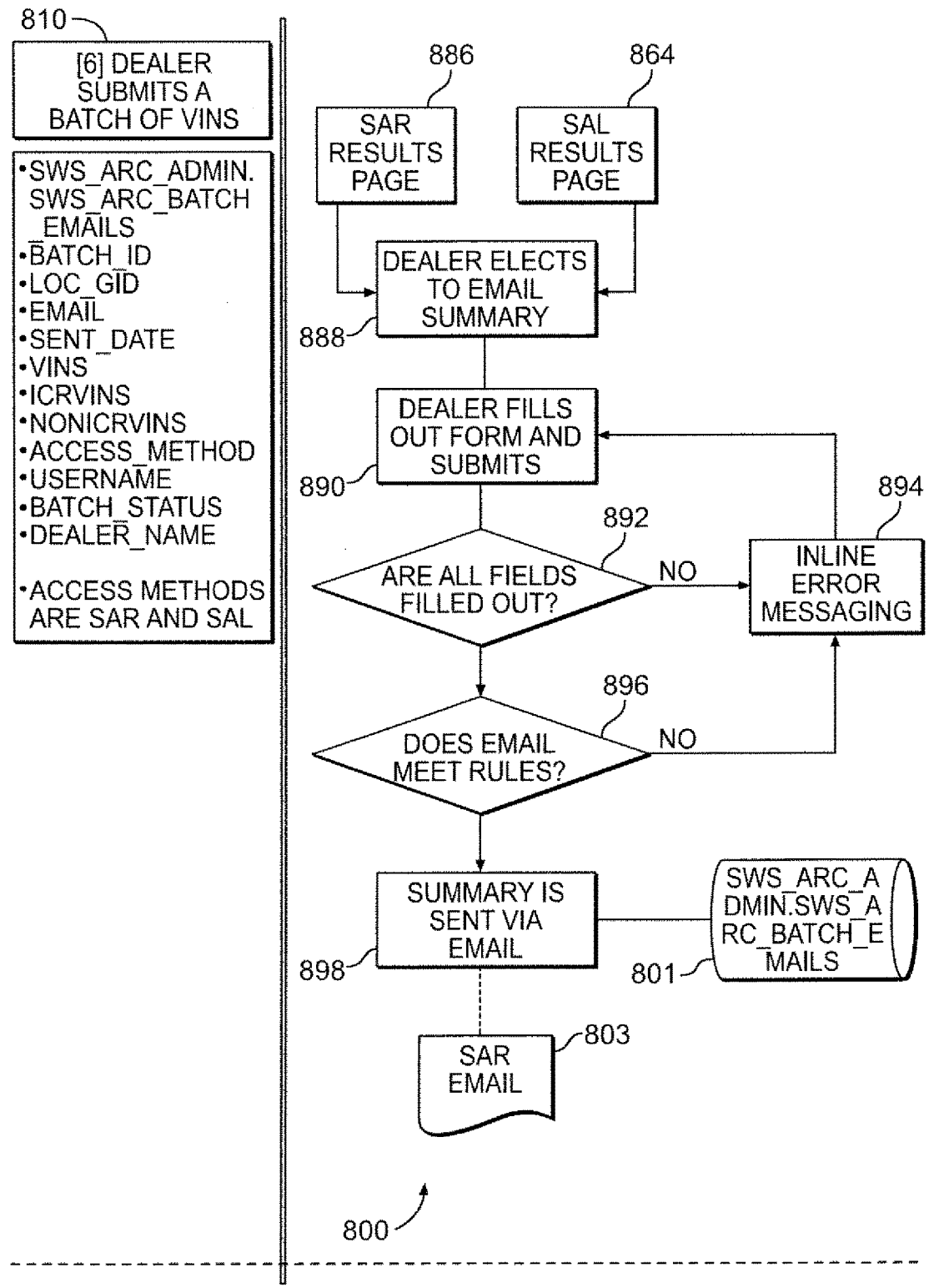

FIG. 8D illustrates the dealer submitting an email batch request process 810. The SAR results page 886 or SAL results page 864 can be emailed to the dealer if the dealer elects to have the summary emailed 888. The dealer fills out a form and submits it 890. It is then determined if all the fields are filled out 892. If no, an inline error message is generated 894. If yes, it is determined whether the email meets rules 896. If no, the inline error message is generated 894. If the email meets the rules, a summary report is sent via email 898 using the sws_arc_admin_sws_arc_batch_e-mails database 801 and the SAR email is sent 803.

Figure 8E:
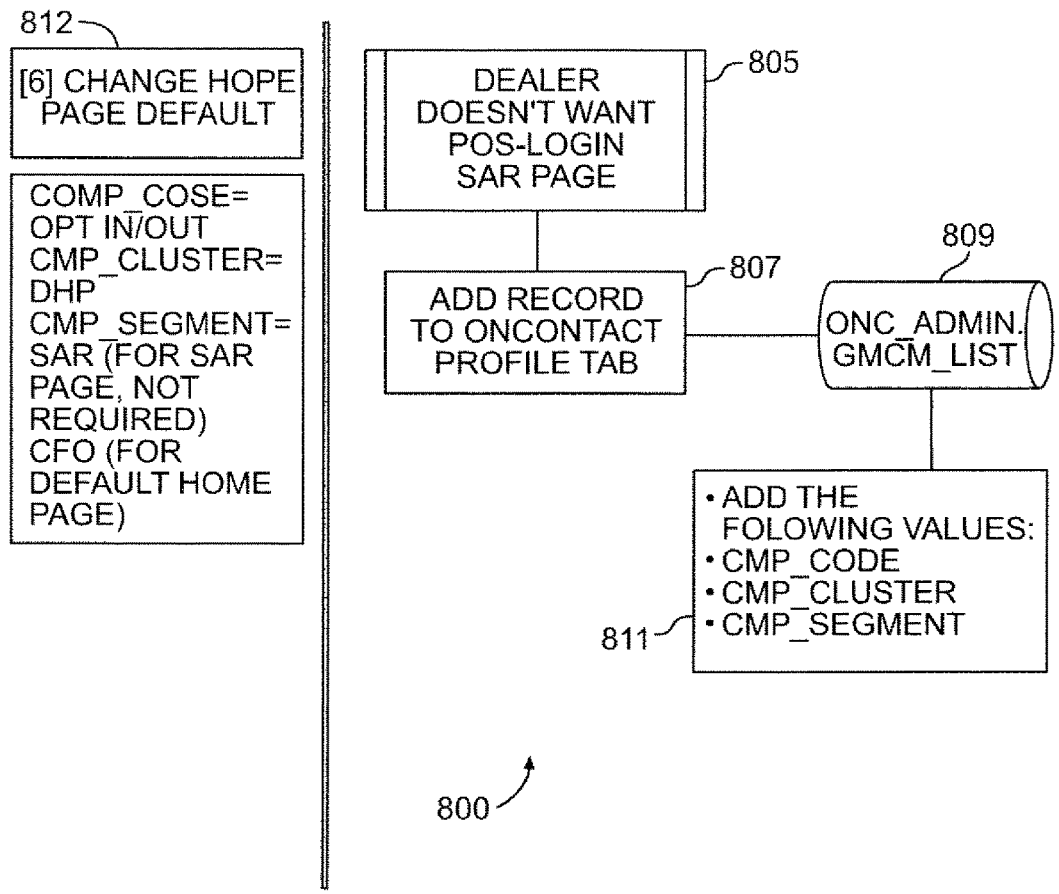

FIG. 8E illustrates the dealer changing the home default process 812. If the dealer does not want the post-login SAR page 805, a record is added to the oncontact profile tab 807 and stored in the conc_admin_gmcm_list 809. The following values are added to the list 811: cmp_code, cmp_cluster, cmp_segment. It will be appreciated that the service provider (e.g., Carfax) can instead make this change for the dealer upon request.

FIGS. 9A-9B illustrates an exemplary screen shot 900 of a summary report 904. The summary report 904 may be accessed using an Internet browser 908 such as Internet Explorer, Firefox, etc. The top half of the summary report 904 is shown in the screen shot 900a, while the bottom half of the summary report 904 is shown in the screen shot 900b. It will be appreciated that the bottom half of the screen shot 900b may be viewed by scrolling down on the page in the web browser 908. The Internet browser 908 includes an address box 912, a "Go" button 916, forward and backward buttons 920, 924 and a pointer 928 that allow the user to interact with the Internet browser 908. A user is presented with this summary report 904 after logging into the service (e.g., a Carfax access method such as Carfaxonline.com). In one embodiment, the summary report 904 is fetched from the summary report data store 208 in memory 120 by the processor 116, which transmits the summary report 904 over the network 108 to the dealer at computer 112.

The illustrated summary report 904 includes a list of VINS 908, the year/make/model 912, the online listing site 916, the number of times the report was searched by consumers 920 and several purchase indicators 922 next to each VIN in the list of VINS 908. A link 924 is provided to run vehicle history report(s).

In FIGS. 9A and 9B, each of the purchase indicators 922 is selected (box with checkmark inside). The user can deselect the purchase indicators 922 for the vehicles for which the dealer does not want to purchase a vehicle history report. Alternatively, the report 904 may be provided with a button that allows the user to deselect all of the indicators 922. The dealer can then individually select the purchase indicators 922. When the user has completed selecting/deselecting the vehicles for which they desire to purchase a vehicle history report, the dealer selects the link 924. When the user selects the link 924, the vehicle history reports for each vehicle that had a purchase indicator selected next to the VIN are processed for the dealer.

Although the purchase indicator is shown as being a box with a check inside it will be appreciated that any type of purchase indicator may be used as an alternative. In addition, although the summary report is shown with each vehicle initially selected, it will be appreciated that the summary report can be presented with each vehicle unselected. Other purchase indicators, such as purchase option buttons or links may be provided.

It will be appreciated that the summary report may have less information or more information than shown in FIGS. 9A and 9B. For example, the summary report may have only the list of VINs. In another embodiment, the dealer can first be presented with a general summary of the summary report and then can choose to look at a more detailed summary report, as shown in FIGS. 9A and 9B. For example, the general summary may simply say "You have 16 vehicles listed online without a Carfax report—6 of which are 1-owner and 3 have accidents or other incidents."

FIG. 9C illustrates an exemplary screen shot of a summary report receipt page 950. The summary report receipt page 950 is presented to the dealer after selecting the VINs to run by, for example, selecting the link 924 after deselecting the purchase indicators 922 next to any VINs for which the dealer does not want to purchase a vehicle history report. The summary report receipt page 950 may be emailed to the dealer as an alternative to presenting it directly to the user or in addition to presenting it to the user. The summary report page 950 summarizes the information on the vehicle history reports that the dealer purchased.

The illustrated summary report receipt page 950 includes a list of VINs 954, and, for each vehicle, the year, make and model 956, the number of owners 958, a status identifier 960, a details section 962 and the availability of the vehicle history report online 964. It will be appreciated that the summary report receipt page 950 may include less than or more than this information. The status identifier 960 may also be used in the summary report 904 to indicate a possibly negative vehicle event (e.g., accident reported, parts requested for repair, etc.)

The summary reports are advantageous because it provides convenience to the dealers because the list of VINs is automatically populated so the dealer can quickly order vehicle history report without having to type each VIN individually. In addition, the dealers maintain control over their purchase decision. The dealers have the opportunity to individually select the VINs for which they want to run vehicle history reports.

The summary report is also advantageous because it provides information to help dealers choose vehicles for which to run vehicle history reports. For example, the status of each vehicle in the dealer's inventory is provided so that dealers can ensure that their policies regarding having a report for each car in their inventory are followed. In addition, the consumer activity related to a vehicle can influence a dealer's decision to purchase a vehicle history report. Similarly, if the vehicle is a CPO vehicle, the dealer can be alerted if the vehicle is not in compliance with the CPO program. The summary report may also identify vehicles that satisfy CPO rules but are not identified as CPO by the dealer.

In addition, the ability to have a one-click ordering process, provides convenience to the dealers, and also increases the ability for the vehicle history report service provider to sell additional vehicle history reports.

Figure 10:
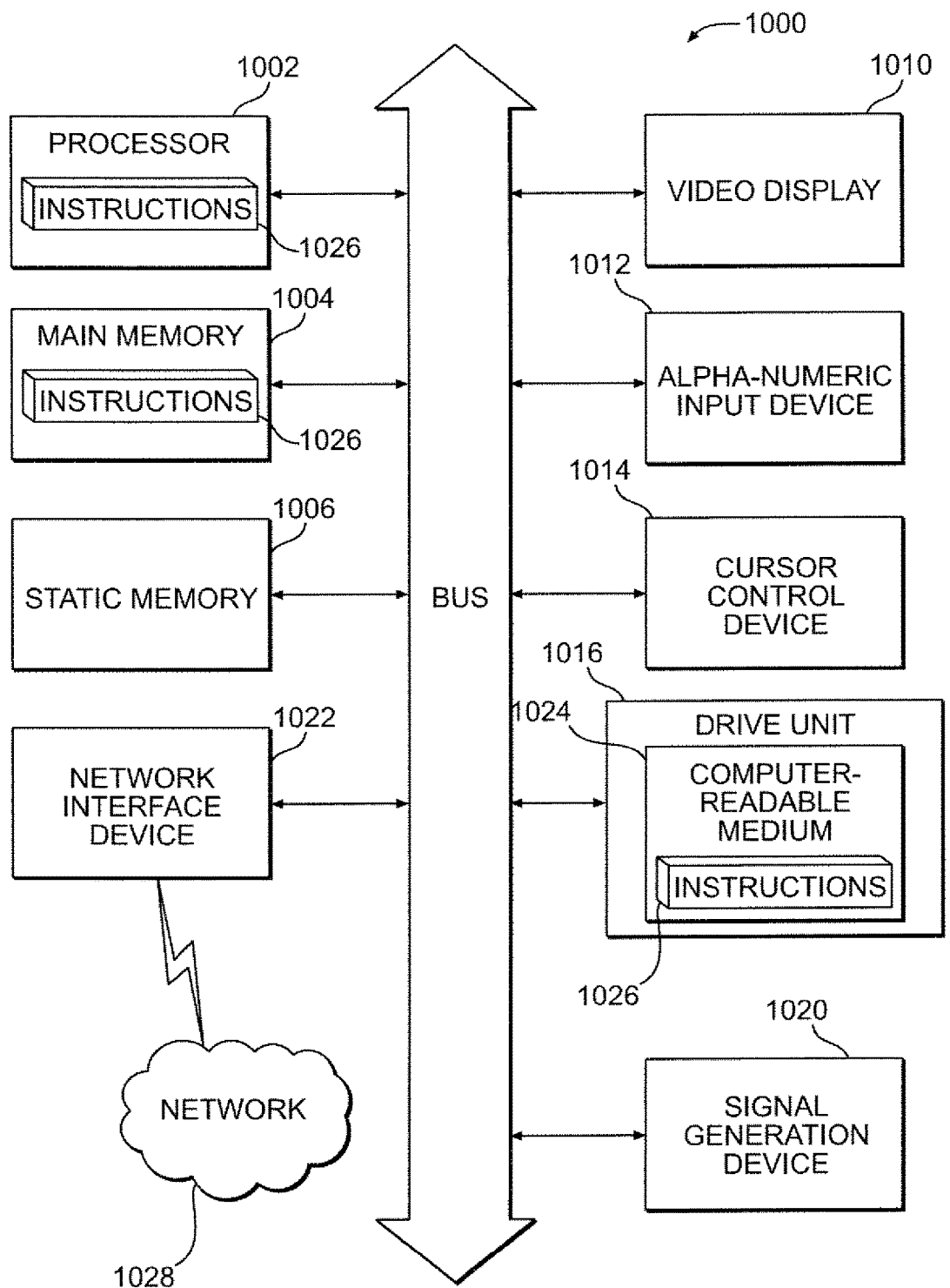
FIG. 10 is a block diagram of an exemplary computer system in accordance with one embodiment of the invention.

FIG. 10 shows a diagrammatic representation of machine in the exemplary form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processor 1002 (e.g., a central processing unit (CPU), a graphics processing unit (GPU) or both), a main memory 1004 (e.g., read only memory (ROM), flash memory, dynamic random access memory (DRAM) such as synchronous DRAM (SDRAM) or Rambus DRAM (RDRAM), etc.) and a static memory 1006 (e.g., flash memory, static random access memory (SRAM), etc.), which communicate with each other via a bus 1008.

The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1020 (e.g., a speaker) and a network interface device 1022.

The disk drive unit 1016 includes a machine-readable medium 1024 on which is stored one or more sets of instructions (e.g., software 1026) embodying any one or more of the methodologies or functions described herein. The software 1026 may also reside, completely or at least partially, within the main memory 1004 and/or within the processor 1002 during execution thereof by the computer system 1000, the main memory 1004 and the processor 1002 also constituting machine-readable media.

The software 1026 may further be transmitted or received over a network 1028 via the network interface device 1022.

While the machine-readable medium 1024 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method, implemented by a computer system comprising a computer having a processing device operatively connected to a physical memory device and a communication device, the computer system being programmed to perform acts, the method comprising steps of:

obtaining, using the processing device from a vehicle identification number (VIN) data store, a vehicle inventory of a dealer, each vehicle in the vehicle inventory being associated with a VIN;

obtaining, using the processing device from a dealer usage data store, data indicative of vehicle history reports purchased by the dealer;

determining, using the processing device, (i) a subset of vehicles in the vehicle inventory of the dealer for which the dealer has not purchased a vehicle history report, and (ii) a number of consumers that have accessed a vehicle history report associated with one or more vehicles in the subset of vehicles;

generating, using the processing device, a summary report comprising a list identifying vehicles in the subset of vehicles and information indicative of the number of consumers that have accessed a vehicle history report associated with the one or more vehicles, the summary report configured to permit purchasing of vehicle history reports corresponding to any vehicle listed in the summary report; and transmitting, using the processing device, the summary report to a display device associated with the dealer through a network.

2. The method of claim 1, wherein the summary report comprises a list of the one or more vehicles with a purchase indicator in proximity to each listing of a vehicle in the list of one or more vehicles.

3. The method of claim 2, wherein the purchase indicator is deselectable.

4. The method of claim 1, further comprising:

accessing, using the processing device, a consumer usage data store;

identifying, using the processing device, the number of consumers accessing a vehicle history report for each vehicle in the subset of vehicles; and associating, using the processing device, the number of consumers accessing each vehicle history report with the summary report.

5. The method of claim 4, wherein identifying the number of consumers accessing the vehicle history report for each vehicle in the subset of vehicles comprises identifying, using the processing device, a number of consumers that purchased the vehicle history report.

6. The method of claim 4, wherein identifying the number of consumers accessing the vehicle history report for each vehicle in the subset of vehicles comprises identifying, using the processing device, a number of consumers that requested a record check for a vehicle in the subset of vehicles.

7. The method of claim 1, further comprising:

accessing, using the processing device, a certified pre-owned (CPO) unit data store to identify vehicles designated as CPO units.

8. The method of claim 7, further comprising:

adding, using the processing device, information in the summary report that identifies the vehicles designated as CPO units.

9. The method of claim 7, further comprising:

adding, using the processing device, data indicating the vehicles designated as CPO units to the vehicle inventory of the dealer.

10. The method of claim 1, wherein transmitting, using the processing device, the summary report to the display device associated with the dealer through the network comprises:

transmitting, to the display device associated with the dealer, website data that provides access to the summary report through the Internet; or transmitting, through the network to the display device associated with the dealer, an electronic mail that includes the summary report.

11. The method of claim 1, further comprising:
receiving, by the processing device from the display device associated with the dealer through the network, an indication of a selection to purchase a vehicle history report for at least one of the vehicles listed in the summary report.

12. The method of claim 11, wherein receiving, by the processing device from the display device associated with the dealer through the network, the indication of the selection to purchase a vehicle history report for at least one of the vehicles listed in the summary report comprises:
receiving purchase data indicating that a web link for purchasing the vehicle history report for at least one of the vehicles listed in the summary report has been selected; and
receiving selection data indicating selection of at least one purchase indicator corresponding to the at least one vehicle for which the vehicle history report is purchased; and
wherein the method further comprises:
responsive to receiving the purchase data and the selection data, providing the vehicle history report.

13. A system comprising:
one or more computing devices and one or more storage devices storing instructions which when executed by the one or more computing devices, cause the one or more computing devices to perform operations comprising:
obtaining, from a vehicle identification number (VIN) data store, a vehicle inventory of a dealer, each vehicle in the vehicle inventory being associated with a VIN;
obtaining, from a dealer usage data store, data indicative of vehicle history reports purchased by the dealer;
determining (i) a subset of vehicles in the vehicle inventory of the dealer for which the dealer has not purchased a vehicle history report, and (ii) a number of consumers that have accessed a vehicle history report associated with one or more vehicles in the subset of vehicles;
generating a summary report comprising a list identifying vehicles in the subset of vehicles and information indicative of the number of consumers that have accessed a vehicle history report associated with the one or more vehicles, the summary report configured to permit purchasing of vehicle history reports corresponding to any vehicle listed in the summary report; and
transmitting the summary report to a display device associated with the dealer through a network.

14. The system of claim 13, wherein:
the summary report comprises a list of the one or more vehicles with a purchase indicator in proximity to each listing of a vehicle in the list of one or more vehicles; and
the purchase indicator is deselectable.

15. The system of claim 13, wherein the operations further comprise:
accessing a consumer usage data store;
identifying the number of consumers accessing a vehicle history report for each vehicle in the subset of vehicles; and
associating the number of consumers accessing each vehicle history report with the summary report.

16. The system of claim 13, wherein the operations further comprise:
adding information in the summary report to identify the vehicles designated as CPO units.

17. The system of claim 13, wherein transmitting the summary report to the display device associated with the dealer through the network comprises:
transmitting, to the display device associated with the dealer, website data that provides access to the summary report through the Internet; or
transmitting, through the network to the display device associated with the dealer, an electronic mail that includes the summary report.

18. The system of claim 13, wherein the operations further comprise:
receiving, from the display device associated with the dealer through the network, an indication of a selection to purchase a vehicle history report for at least one of the vehicles listed in the summary report.

19. The system of claim 18, wherein receiving, from the display device associated with the dealer through the network, the indication of the selection to purchase a vehicle history report for at least one of the vehicles listed in the summary report comprises:
receiving purchase data indicating that a web link for purchasing the vehicle history report for at least one of the vehicles listed in the summary report has been selected; and
receiving selection data indicating selection of at least one purchase indicator corresponding to the at least one vehicle for which the vehicle history report is purchased; and
wherein the operations further comprise:
responsive to receiving the purchase data and the selection data, providing the vehicle history report.

20. A system comprising:
one or more computing devices and one or more storage devices storing instructions which when executed by the one or more computing devices, cause the one or more computing devices to perform operations comprising:
obtaining, from one or more storage databases, (i) a dealer vehicle inventory of a dealer, and (ii) data indicative of vehicle history reports purchased by the dealer;
generating a summary report that (I) identifies a subset of vehicles in the dealer vehicle inventory for which the dealer has not purchased a vehicle history report, and (II) provisions purchasing of vehicle history reports corresponding to vehicles in the subset of vehicles;
transmitting the summary report to a display device associated with the dealer through a network;
receiving, from the display device associated with the dealer through the network, an indication of a selection to purchase a vehicle history report for at least one of the vehicles listed in the summary report, wherein the receiving comprises:
receiving purchase data indicating that a web link for purchasing the vehicle history report for at least one of the vehicles listed in the summary report has been selected; and
receiving selection data indicating selection of at least one purchase indicator corresponding to the at least one vehicle for which the vehicle history report is purchased; and responsive to receiving the indication of the selection to purchase a vehicle history report, transmitting the vehicle history report.

\* \* \* \* \*